United States Patent
Iizuka et al.

(10) Patent No.: US 6,771,385 B1
(45) Date of Patent: Aug. 3, 2004

(54) METHOD OF USING A SERVER CONNECTED WITH A NETWORK AND A SERVER SYSTEM

(75) Inventors: Hiroyuki Iizuka, Hino (JP); Hiroshi Ikeda, Hino (JP); Takashi Igarashi, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/516,085

(22) Filed: Mar. 1, 2000

(30) Foreign Application Priority Data

| Mar. 3, 1999 | (JP) | 11-054893 |
| Mar. 11, 1999 | (JP) | 11-065696 |
| Mar. 18, 1999 | (JP) | 11-074452 |

(51) Int. Cl.[7] .................. G06F 3/12; G06F 15/00; G06K 15/02
(52) U.S. Cl. .................. 358/1.15; 717/168; 717/169; 717/170; 717/171; 707/203
(58) Field of Search .................. 358/1.15, 1.16; 717/171, 174, 168, 169, 170, 172, 173, 175, 176, 177, 178; 714/47; 707/203

(56) References Cited

U.S. PATENT DOCUMENTS

| 4,843,405 A | * | 6/1989 | Morikawa et al. .......... 347/224 |
| 5,436,981 A | * | 7/1995 | Ishikawa .................... 382/173 |
| 5,483,361 A | * | 1/1996 | Shimizu et al. ............. 358/529 |
| 5,537,550 A | * | 7/1996 | Russell et al. .............. 709/224 |
| 5,537,626 A | * | 7/1996 | Kraslavsky et al. ........... 710/8 |
| 5,625,711 A | * | 4/1997 | Nicholson et al. .......... 382/224 |
| 5,659,407 A | * | 8/1997 | Andresen et al. ........... 358/530 |
| 5,901,276 A | * | 5/1999 | Murahashi et al. ........ 358/1.13 |
| 5,946,457 A | * | 8/1999 | Nakai et al. ............... 358/1.13 |
| 6,041,183 A | * | 3/2000 | Hayafune et al. ........... 717/173 |

* cited by examiner

*Primary Examiner*—Edward Coles
*Assistant Examiner*—David Jones
(74) *Attorney, Agent, or Firm*—Frishauf, Holtz, Goodman & Chick, P.C.

(57) ABSTRACT

A method of using a server connected with a network, includes the steps of storing data of software to transmit to a plurality of image forming apparatus connected with the network, wherein the software controls the image forming apparatus so as to form an image; transmitting data of the software to at least one of the plurality of image forming apparatus; receiving information regarding at least one of a function and a history of the at least one of the plurality of image forming apparatus; accumulating the received information regarding the function and the history of the at least one of the plurality of image forming apparatus; upgrading data of the software for improving the function based on the accumulated information regarding the function of the at least one of the plurality of image forming apparatus; and transmitting the upgraded data of the software to the at least one of the plurality of image forming apparatus.

19 Claims, 17 Drawing Sheets

FIG. 12

| NAMES |
|---|
| 1. CHANNEL DATA (TEXT DATA) |
|    1) MASTER CHANNEL |
|    2) PAPER CHANNEL |
|    3) FILM CHANNEL |
|    4) SCANNER CHANNEL |
|    5) REVERSAL CHANNEL |
|    6) REVERSAL FILM CHANNEL |
|    7) INPUT USE GRADATION SETTING DATA |
|    8) INPUT OUTPUT USE GRADATION SETTING DATA |
|    9) OUTPUT GRADATION SETTING DATA |
|    10) OUTPUT GRADATION SETTING SENSITOMETRY DATA |
|    11) DX TABLE |
|    12) FB SCANNER CHANNEL |
|    13) ANX SETTING TABLE |
|    14) PHOTOMETRY CONSTANT RELATED DATA |
|    15) DIGITAL CAMERA CHANNEL |
|    16) OTHER MEDIA CHANNEL |
|    17) PAPER TYPE TABLE |
|    18) USER SETTING COLOR MANAGEMENT |
|    19) COLOR MANAGEMENT INITIAL VALUE |
|    20) DATA FOR CORRECTION BETWEEN PIXELS |
| |
| 2. MONITOR CHANNEL (TEXT DATA) |
|    1) VISUAL MASTER CHANNEL |
|    2) VISUAL SUB-CHANNEL |
|    3) VISUAL FILM CHANNEL |
|    4) VISUAL DIGITAL CHANNEL |
|    5) VISUAL FB SCANNER CHANNEL |
|    6) VISUAL HARD CHANNEL |
|    7) VISUAL DIGITAL CAMERA CHANNEL |

FIG. 13

| NAMES |
|---|
| 3. HDC SET VALUE DATA (BINARY DATA) |
|     1) PARAMETER SETTING DATA |
|     2) FILTER COEFFICIENT SETTING DATA |
|     3) GRADATION CORRECTION PARAMETER TRANSFER DATA |
|     4) HEAD TYPE SETTING DATA |
|     5) TOP POSITION PARAMETER TRANSFER DATA |
|     6) PITCH CORRECTION PARAMETER TRANSFER DATA |
|     7) CORRECTION BETWEEN PIXELS PARAMETER TRANSFER DATA |
|     8) S REGISTER PARAMETER TRANSFER DATA |
|   |
|   |
| 4. SEQUENCE CONTROLLER SET VALUE DATA (BINARY DATA) |
|     1) PARAMETER SETTING DATA |
|     2) FLUSH PARAMETER SETTING DATA |
|     3) FEED-BACK PROCESSING PARAMETER SETTING DATA |
|   |
|   |
| 5. PROCESSOR SET VALUE DATA (BINARY DATA) |
|     1) STATUS COMMAND DATA |
|     2) OPERATION COMMAND DATA |
|     3) SETTING COMMAND DATA |
|     4) DATA REQUEST INTERNAL DATA |
|   |

FIG. 14

| NAMES |
|---|
| 6. SCANNER SET VALUE DATA (BINARY DATA) |
|    1) IMAGE SIZE SETTING DATA |
|    2) IMAGE PICKUP CONDITION SETTING DATA |
|    3) LCU DATA SETTING DATA |
|    4) CCPROC COEFFICIENT SETTING DATA |
|    5) SCANNER DRIVING CONDITION SETTING DATA |
|    6) ANC CONDITION SETTING DATA |
|    7) CARRIER CONVEYANCE CONDITION SETTING DATA |
| |

FIG. 15

| NAMES |
|---|
| 7. APPLICATION SET VALUE DATA (TEXT DATA) |
|    1) RECEIPT PRINTING DATA |
|    2) MEDIA UNIT PRICE DATA |
|    3) SALES FUNCTION SETTING DATA |
|    4) DISCOUNT DATA |
|    5) DATA OF AMOUNT OF PAPER USED |
|    6) DATA OF AMOUNT OF ECONOMY JET USED |
|    7) BACKPRINT DATA |
|    8) SETTING DATA ON EACH WEEKDAY |
|    9) COMMON TIME SETTING DATA |
|    10) SPECIFIC DAY DATA |
|    11) PAPER COLLECTION DATA |
|    12) BACKUP FILE TABLE DATA |
|    13) MODE PROTECT INFORMATION |
|    14) EXTERNAL PC INFORMATION |
|    15) INDEX FAILURE INFORMATION |
|    16) INDEX MODE INFORMATION |
|    17) MODE JOB CONDITION CHECK TABLE |
|    18) BACKPRINT TITLE JAPAN 1 |
|    19) BACKPRINT TITLE JAPAN 2 |
|    20) BACKPRINT TITLE DENMARK |
|    21) BACKPRINT TITLE ENGLAND |
|    22) BACKPRINT TITLE FINLAND |
|    23) BACKPRINT TITLE FRANCE |
|    24) BACKPRINT TITLE GERMANY |
|    25) BACKPRINT TITLE ITALY |
|    26) BACKPRINT TITLE NORWAY |
|    27) BACKPRINT TITLE PORTUGAL |
|    28) BACKPRINT TITLE SPAIN |
|    29) BACKPRINT TITLE SWEDEN |
|    30) BACKPRINT TITLE AMERICA |
|    31) INDEX PRINT DATA FILE |
|    32) BACKPRINT DISPLAY FILE |
|    33) PRINT SELECTION INITIALIZING INFORMATION |
|    34) TEMPLATE FILE INFORMATION |
|    35) FILE EXTENSION INFORMATION |
|    36) WB/BL INFORMATION |
|    37) FLUSH INFORMATION |
|    38) CARTRIDGE ERROR INFORMATION |
|    39) INFORMATION OF CORRECTION FOR WATER SUPPLIED FOR EVAPORATION |
|    40) SMALL AMOUNT AUTOMATIC WATER SUPPLY CORRECTION |
|    41) HEAD POSITION ADJUSTMENT |
|    42) HEAD POSITION ADJUSTMENT  INITIALIZING FILE |
|    43) HEAD POSITION ADJUSTMENT  DIFFERENTIAL FILE |
|    44) |
| |

FIG. 16

| NAMES |
|---|
| 8. CONTROL STRIPS DATA |
|    1) CONTROL STRIPS DATA |
| |
| |
| 9. PIXEL CORRECTION DATA |
|    1) ZIGZAG B1 DATA |
|    2) ZIGZAG B2 DATA |
|    3) ZIGZAG G1 DATA |
|    4) ZIGZAG G2 DATA |
|    5) HEAD DOT DATA |
| EXISTENCE OF VARIABLE FILE OF EXTENSION COE AND DAT |
| |
| |
| 10. RECORDED DATA |
|    1) ORDER TRANSACTION DATA |
|    2) MEDIA DATA TOTALED DAILY |
|    3) PRINT DATA TOTALED DAILY |
|    4) MEDIA DATA TOTALED WEEKLY |
|    5) PRINT DATA TOTALED WEEKLY |
|    6) MEDIA DATA TOTALED MONTHLY |
|    7) PRINT DATA TOTALED MONTHLY |
|    8) ERROR HISTORY |
|    9) SYSCON LOG |
|    10) DEVCON LOG |
| |

FIG. 17

| NAMES |
|---|
| 11. HDC MAINTENANCE DATA (BINARY DATA) |
|     1) HDC STATUS |
|     2) HDC VERSION INFORMATION |
|   |
|   |
| 12. SEQUENCE CONTROLLER MAINTENANCE DATA (BINARY DATA) |
|     1) STATUS REPLY |
|     2) FEEDBACK DATA REPLY |
|     3) TEST STATUS REPLY |
|   |
|   |
| 13. PROCESSOR MAINTENANCE DATA (BINARY DATA) |
|     1) STATUS SENDING |
|     2) SET DATA SENDING |
|     3) INTERNAL SET DATA SENDING |
|     4) INTERNAL DATA SENDING |
|     5) TEST STATUS SENDING |
|     6) READ DATA SENDING |
|     7) WRITE DATA SENDING |
|     8) PROGRAM DATA SENDING |
|     9) PROGRAM STATUS REPLY |
|   |
|   |

FIG. 18

| NAMES |
|---|
| 14. SCANNER MAINTENANCE DATA (BINARY DATA) |
| 1) NEGATIVE STATUS REPLY |
| 2) NEGATIVE INFORMATION REPLY |
| 3) TEST STATUS REPLY |
| 4) NEGATIVE INTERNAL DATA REPLY |
| 5) SCANNER ADJUSTMENT INFORMATION REPLY |
| 6) LIGHT QUANTITY MEASUREMENT DATA REPLY |
| 7) IMAGE CUTTING POSITION DATA REPLY |
| 8) WHITE CORRECTION DATA REPLY |
| 9) BLACK CORRECTION DATA REPLY |
|  |
|  |

METHOD OF USING A SERVER CONNECTED WITH A NETWORK AND A SERVER SYSTEM

BACKGROUND OF THE INVENTION

The present invention relates to a method of using a server connected with a network and to a server system, an in particular, the invention deals with information concerning a plurality of image forming apparatuses connected with a server.

In an output center and a mini-lab (small-sized photofinishing laboratory) for an image print service, for example, there have been used various types of image forming apparatuses. In the output center and mini-lab of this kind, various types of print services are offered by the use of a software, and a system is operated.

As an image forming apparatus of this type, an apparatus of a digital processing type employing, for example, a silver halide light-sensitive material has therein an image inputting section, a frame memory, an image processing section, a conveyance section, an exposure section, a development processing section, a system control section and CPU section.

In the apparatus of this kind, programs for each of the image inputting section, frame memory, image processing section, conveyance section, exposure section, development processing section and the system control section are recorded in EP-ROM, EEP-ROM and in a flush memory, and each processing section is executed based on the program, thereby, a print can be made. These programs are updated occasionally for correction of program errors called a bug and for addition of new functions, and even in the case of CPU section, a program for operation recorded on a hard disk is updated frequently.

An image forming apparatus used in such an output center or a mini-lab as stated above requires many types of consumables, and when errors in ordering take place or when troubles are caused, actions have been taken in each output center or mini-lab and repairs have been made individually. Therefore, absence of parts in stock has sometimes interfered with operation of the output center or mini-lab to make it lose its chance for profit.

It has been tried frequently that data for troubles of an image forming apparatus in the aforesaid output center or mini-lab are obtained on the equipment side, and a software for correcting the troubles is updated on occasion frequently.

In the case of the foregoing, a person in charge of maintenance and repair of an image forming apparatus (hereinafter referred to as a maintainer) has visited the location where the image forming apparatus is installed each time to do jobs including confirmation of established data for the image forming apparatus, investigation of software control number conforming to the equipment number of each section of the image forming apparatus and its serial number and confirmation of the arrangement of peripheral equipment, and thereby to select the most appropriate combination for driving the image forming apparatus and to register and update the combination.

Further, when a photographic light-sensitive material is used as an output medium in the image forming apparatus, conditions for replenishing chemicals to be replenished and water need to be changed depending on a difference in amount of processing per day and on an amount of evaporation of processing solutions depending on a season and weather, and the maintainer has judged each time and changed the conditions periodically.

However, when the maintainer does jobs while investigating the program for each section each time, job errors are caused because of existence of a combination of complicated programs, and the image forming apparatus had to be suspended for a long time frequently.

Further, there has been less statistical data for troubles of an image forming apparatus, and there has been no way but to take actions for each image forming apparatus individually. Therefore, when taking actions for troubles, it has been difficult to use data of other image forming apparatuses as reference, resulting in repairs which take a long time.

With regard to information of troubles of an image forming apparatus in the past, a person who is in charge of maintenance and repair (hereinafter referred to as a maintainer) transmitted information, and information collected and summarized through several steps arrived at the persons who are in charge of development of an image forming apparatus. Therefore, the information sometimes was neither conveyed quickly nor conveyed accurately. Accordingly, it sometimes happened that development of software for improving the points to be improved clarified in the situation of actual use of an image forming apparatus was delayed, or the improved software did not satisfy demands of users.

On the contrary, with regard to statistical information concerning a degree of usage and the state of operation of an image forming apparatus in an output center or in a mini-lab, there has been no way except one wherein a user of the image forming apparatus or a company conducts market survey and collects data individually, because the equipment itself was not able to prepare data. Though templates required by a certain area are different from those required by other areas, in the case of a location outside the area, it has been extremely difficult to collect data quickly based on detailed information matching, for example, an age of an orderer and a season. Further, for the actual delivery, it was mostly unable to satisfy the request due to the cost for preparation and transport of media.

In addition, it has been difficult in many cases that further practical use of an image forming apparatus based on the data of usage as well as development of software for conducting appropriate maintenance control are carried out at the appropriate time.

Further, a revised version and a newest version prepared when software of for an image forming apparatus has been revised and software of the old control number for eliminating disused functions are distributed in the form of EP-ROM, floppy disk, photo-electro-magnetic disk and CD-ROM, and thereby, it has been difficult in many cases for an output center and a mini-lab to introduce quickly at the appropriate time, which has checked extension of chances for profits in many cases.

Further, the retrenchment of expenditure through a cut of personnel expenses has been demanded recently, and it has been requested to update maintenance and control data efficiently without visiting the location where an image forming apparatus is installed.

For example, in the case of an output center or a mini-lab developed in the form of a chain store, there is desired a system wherein a base which conducts maintenance and a headquarters of the chain store occasionally check control of sales such as the number of prints, sizes of prints and types of prints in an image forming apparatus, and control of materials including photographic papers and developing agents which need to be replenished from time to time.

SUMMARY OF THE INVENTION

The invention has been achieved in view of the problems stated above, and its first object is to collect or accumulate equipment information through a network, as occasion demands, from an image forming apparatus installed in an output center or a mini-lab, and to conduct efficiently program correction, control of image forming apparatus operation information, control of sales information and control of the image forming apparatus, based on the collected equipment information or on accumulation of the equipment information. The second object is to provide a method of using a server connected with a network and a server system wherein development and delivery of a new software and introduction of templates which meet demands of users are achieved in a short period of time, by delivering the information to the image forming apparatus or to the headquarters of the chain stores through the network.

The above objects can be achieved by following methods.

(1-1) A method of using a server connected with a network, comprises steps of:

receiving information regarding an image forming apparatus transmitted from each of a plurality of image forming apparatus connected with the network; and storing the received information regarding the image forming apparatus.

(1-2) The method of (1-1), wherein the information regarding the image forming apparatus is at least one of information regarding a machinery situation of the image forming apparatus and information regarding a result of an image formation processing by the image forming apparatus.

(1-3) The method of (1-1), wherein the server provides at least one of a web service, a FTP(file transfer protocol) service and a mail service.

(1-4) The method of (1-2), wherein the information regarding the image forming apparatus is the information regarding a machinery situation of the image forming apparatus, and the information regarding a machinery situation of the image forming apparatus includes at least one selected from customer information, store information, equipment maintenance information, error history information, failure log information and remote set-up information.

(1-5) The method of (1-2), wherein the information regarding the image forming apparatus is the information regarding a result of an image formation processing by the image forming apparatus, and the information regarding a result of an image formation processing by the image forming apparatus includes at least one selected from a number of sheets used for image formation, sizes used for image formation, information regarding templates used for image formation, information regarding image forming apparatus used for image formation, information regarding locations where image formation was conducted, and information regarding an amount of consumables used for image formation.

(1-6) The method of (1-1), wherein the storing step stores statistical information of the received information regarding the image forming apparatus.

(1-7) The method of (1-1), wherein the receiving step receives statistic information regarding the image forming apparatus.

(1-8) A method of using a server connected with a network, comprises steps of:

storing data of software to transmit to a plurality of image forming apparatus connected with the network; and transmitting data of the software to at least one of the plurality of image forming apparatus.

(1-9) The method of (1-8), wherein the software is at least one of a control software for controlling the image forming apparatus and an image processing software used at a time that the image forming apparatus forms an image.

(1-10) The method of (1-9), wherein the software is the control software and the control software includes at least one of a software to control an image recording section of the image forming apparatus, a software to control a conveying section of the image forming apparatus, a software to control a developing section of the image forming apparatus, a software to control an image inputting section of the image forming apparatus, a software to control an application software of the image forming apparatus, a software to control an operating section of the image forming apparatus, a software to control a maintenance section of the image forming apparatus, and a software to control a session section of the image forming apparatus.

(1-11) The method of (1-9), wherein the software is the image processing software and the server stores image data of template usable in the image processing software and can transmit the image data of template to the image forming apparatus.

(1-12) The method of (1-11), wherein the image data of template are image data serving as a base for forming an output of an image forming apparatus by the image forming apparatus.

(1-13) The method of (1-9), wherein the software is the image processing software, and further comprising steps of:

receiving the information regarding a result of an image formation processing by the image forming apparatus transmitted from each of the plurality of image forming apparatus connected with the server; and wherein the storing step stores an image processing software developed by using the received information regarding a result of an image formation processing by the image forming apparatus.

(1-14) The method of (1-9), wherein the software is the control software, and the control software is a software delivered from at least one of servers installed in plural areas to the server.

(1-15) The method of (1-9), wherein the software is the control software, and further comprising steps of:

receiving the information regarding a machinery situation of the image forming apparatus transmitted from each of the plurality of image forming apparatus connected with the server; and wherein the storing step stores a software developed by using the received information regarding a machinery situation of the image forming apparatus.

(1-16) A method of using a server connected with a network, comprises steps of:

receiving statistical information regarding a image forming apparatus transmitted from at least one of a plurality of image forming apparatus connected with the server through the network; and transmitting data corresponding to the statistical information.

(1-17) The method of (1-16), wherein the statistical information includes at least one of working information of the image forming apparatus, using information for data acting on the image forming apparatus, image information used by the image forming apparatus, customer information, store information, sales information, equipment maintenance information, error history information, failure log information and remote setup information.

(1-18) The method of (1-16), wherein the server provides at least one of a web service, a FTP(file transfer protocol) service and a mail service.

(1-19) The method of (1-16), wherein the transmitting step transmits the data corresponding to the statistical information on the basis of on the statistical information regarding a image forming apparatus transmitted from at least one of a plurality of image forming apparatus connected with the server.

(1-20) The method of (1-16), wherein the transmitting step transmits the data corresponding to the statistical information through the server on the basis of on the statistical information regarding a image forming apparatus transmitted from at least one of a plurality of image forming apparatus connected with the server.

(1-21) The method of (1-16), wherein the data are transmitted to an image forming apparatus having no statistical information.

(1-22) A server system for carrying out the method of (1-16).

Further, the above object may be achieved by following preferable methods.

(2-1)

A method of using a server connected with a network, wherein information of the state of an image forming apparatus at the image forming apparatus delivered, through a server, from plural image forming apparatuses connected to the server is stored in the server.

In the invention of (2-1), pieces of information of the state of image forming apparatuses are delivered to a server connected with each image forming apparatus on a network to be stored therein. In case of necessity on each image forming apparatus side, therefore, information pertaining to the state of the image forming apparatus such as a history of usage of itself or to the image forming apparatus state of another image forming apparatus, for example, can be obtained easily in a simple manner. Due to this, when troubles happen, for example, necessary information can be obtained easily in a simple manner. Further, on the part where maintenance of an image forming apparatus is conducted, it is possible to grasp properly the total state of an image forming apparatus and to make preparations for maintenance in advance. Further, on the part where installation of an image forming apparatus is conducted, it is possible to obtain pieces of information of parts control, sales control and products which are broadly popular, and to make them to be useful for sales forecast in the near future. Due to this, it is possible to control efficiently an image forming apparatus and to control information of the image forming apparatus.

(2-2)

The method of using a server connected with a network according to (2-1), wherein the server provides at least one of web service, FTP service and mail service.

(2-3)

The method of using a server connected with a network according to (2-1), wherein one or more information selected from customer information, store information, equipment maintenance information, error history, failure log information and remote set up information are included in the information of the state of an image forming apparatus.

The invention of (2-3) is represented by a method of using a server connected with a network, wherein information of results of image processing on the aforesaid image forming apparatus delivered through a server from plural image forming apparatuses connected to the server is stored in the server. The information of results of image processing includes one or more information selected from information of the number of sheets for image forming processing, information of the sizes for image forming processing, information of templates used for image forming processing, information of the image forming apparatus used for image forming processing, information of locations for image forming processing, and information of an amount of consumables used for image forming processing.

The consumables in this case represent ink used on the image forming apparatus, ink ribbons, plain paper, specialized image receiving paper, photographic paper, processing agents, and toner. The template in this case represents a form wherein an object (dynamic images, static images, characters and sounds) can be stuck at the position determined in advance, or it represents digital data. Images, sounds and characters may also be stuck previously on the template as a background.

In the invention of (2-3), pieces of information of results of image forming processing are delivered to a server connected with each image forming apparatus on a network to be stored therein. In case of necessity on each image forming apparatus side, therefore, information pertaining to history of image forming processing of its own or image forming processing of another image forming apparatus can be obtained. Due to this, information of results of image forming processing can be obtained quickly in a simple manner. Further, on the part where maintenance of an image forming apparatus is conducted, it is possible to grasp properly the state of the total image forming apparatuses for image forming processing, and to make preparations for maintenance and to prepare consumables such as recording paper in advance. Due to this, it is possible to control efficiently an image forming apparatus and to control information of the image forming apparatus. Further, information of results of image processing includes one or more information selected from information of the number of prints made, information of the size of prints made, information of templates used for making prints, information of the image forming apparatus used for making prints, information of the location for making prints, and information of an amount of consumables used for making (2-4)

A method of using a server connected with a network, wherein information of the results of image forming processing at an image forming apparatus delivered, through a server, from plural image forming apparatuses connected to the server is stored in the server.

(2-5)

The method of using a server connected with a network according to (2-4), wherein one or more information selected from information of the number of sheets for image forming processing, sizes for image forming processing and of templates used for image forming processing, information of an image forming apparatus used for image forming processing, information of the location where image forming processing was conducted, and information of the amount of consumables used for image forming processing, are included in the information of the results of image forming processing.

(2-6)

A method of using a server connected with a network, wherein data of software for controlling an image forming apparatus are stored in the server as information delivered, through the server, to plural image forming apparatuses connected to the server.

In the invention of (2-6), a server connected to a network stores therein data of software for controlling an image forming apparatus, and it delivers data of the software to each network. Therefore, even when software for controlling an image forming apparatus is revised, the newest software can be obtained in a simple way when it is needed on the part of the image forming apparatus. It is further possible to obtain new software for controlling an image forming apparatus, as occasion demands. Due to this, software for controlling an image forming apparatus can easily be obtained on each image forming apparatus.

(2-7)

The method of using a server connected with a network according to (2-6), wherein the software for controlling the image forming apparatus is one to control an image recording section of the image forming apparatus.

(2-8)

The method of using a server connected with a network according to (2-6), wherein the software for controlling the image forming apparatus is one to control a conveyance section of the image forming apparatus.

(2-9)

The method of using a server connected with a network according to (2-6), wherein the software for controlling the image forming apparatus is one to control a developing section of the image forming apparatus.

(2-10)

The method of using a server connected with a network according to (2-6), wherein the software for controlling the image forming apparatus is one to control an image inputting section of the image forming apparatus.

(2-11)

The method of using a server connected with a network according to (2-6), wherein the software for controlling the image forming apparatus is one to control application software of the image forming apparatus.

(2-12)

The method of using a server connected with a network according to (2-6), wherein the software for controlling the image forming apparatus is one to control an operation section of the image forming apparatus.

(2-13)

The method of using a server connected with a network according to (2-6), wherein the software for controlling the image forming apparatus is one to control a maintenance section of the image forming apparatus.

(2-14)

The method of using a server connected with a network according to (2-6), wherein the software for controlling the image forming apparatus is one to control a session section of the image forming apparatus.

(2-15)

The method of using a server connected with a network according to either one of (2-6)–(2-14), wherein the software for controlling the image forming apparatus is one delivered from servers installed in plural areas to the aforesaid server.

(2-16)

The method of using a server connected with a network according to either one of (2-6)–(2-15), wherein the software for controlling the image forming apparatus is one developed by the use of the information of the state of an image forming apparatus stored in the server used in the method of using a server connected with a network described in (2-1), (2-2) or (2-3).

The software for controlling an image forming apparatus mentioned above is one developed by the use of information of the state of the image forming apparatus stored in a server used in the method of using the server connected to the network. Due to this, it is possible to develop software for controlling an image forming apparatus in accordance with the state of the image forming apparatus, or to correct conventional ones. Therefore, it is possible to provide software for controlling an image forming apparatus in which the state on the side of installation of the image forming apparatus is reflected to each image forming apparatus through a network.

(2-17)

A method of using a server connected with a network, wherein data of software for image processing used for forming an image with an image forming apparatus are stored in the server as information to be delivered, through the server, to plural image forming apparatuses connected to the server.

In the invention, a server connected to a network stores data of software for image processing and delivers the data of the software to each image forming apparatus. Therefore, even when the software for image processing is revised, the newest software can be obtained easily on the part of each image forming apparatus when that software is needed. Further, new software for image processing can be obtained as occasion demands. Due to this, software for image processing can easily be obtained in each image forming apparatus.

(2-18)

The method of using a server connected with a network according to (2-17), wherein image data of a template used in the software for image processing are stored in the server.

Due to the foregoing, it is possible to supply to each image forming apparatus various types of templates in each of which image information such as a photograph can be inserted, as software for image processing. It is further possible to supply image data for a template developed on the part of installation of the image forming apparatus to another image forming apparatus.

(2-19)

The method of using a server connected with a network according to (2-18), wherein the image data of the template are those serving as a base for forming an output of an image forming apparatus on the image forming apparatus.

Due to the foregoing, a template can be made from image data of an object outputted from an image forming apparatus. Therefore, an image of an object outputted from an image forming apparatus can be utilized freely as a template, which is convenient.

(2-20)

The method of using a server connected with a network according to either one of (2-17)–(2-19), wherein the software for image processing is one developed by the use of the information of the results of image forming processing stored in the server used in the method of using a server connected with a network (2-1), (2-2), (2-3), (2-4) or (2-5).

The foregoing makes it possible to develop software for image processing in accordance with the result of image forming processing and to correct conventional ones. Accordingly, it is possible to provide software for image processing in which the information of the result of image forming processing on the part of installation of the image forming apparatus is reflected to each image forming apparatus through a network.

(2-21)

A server system wherein the method of using a server connected with a network described in either one of (2-1)–(2-20) can be executed.

(2-22)

A method of using a server connected with a network wherein, based on statistical information obtained from plural image forming apparatuses connected to the server, data corresponding to the statistical information are delivered to the image forming apparatus as preferable structure.

(3-1)
A method of using a server connected with a network wherein, based on statistical information obtained from plural image forming apparatuses connected to the server, data corresponding to the statistical information are delivered to an image forming apparatus through the server.

(3-2)
A method of using a server connected with a network wherein the server delivers data to a specific image forming apparatus, then, receives information of the state of operation of the image forming apparatus in which the aforesaid data are installed, and delivers the aforesaid data to another image forming apparatus in accordance with the information of the state of operation.

(3-3)
A method of using a server connected with a network wherein, based on equipment information obtained from each image forming apparatus connected to the server, the server delivers data corresponding to the equipment information, through the server.

(3-4)
A method of using a server connected with a network wherein each image forming apparatus connected to the aforesaid server transmits, through the server, a request for updating functions to the server, and this server delivers data for updating functions to the image forming apparatus which requested updating of functions.

(3-5)
A method of using a server connected with a network wherein data are automatically delivered to a specific image forming apparatus, then, information of the state of operation of the equipment in which the aforesaid data have been installed is automatically received, and the aforesaid data are delivered automatically to another equipment in accordance with the information of the state of operation.

(3-6)
A method of using a server connected with a network wherein information of a combination of operatable data of each image forming apparatus connected to the server is stored in the server through the server.

(3-7)
A method of using a server connected with a network according to (3-1), wherein the statistical information obtained from the image forming apparatus includes one or more pieces of information selected from information of operation of the image forming apparatus, information of usage of data operated on the image forming apparatus, image information used by the image forming apparatus, customer information, store information, sales information, equipment maintenance information, error history information, failure log information and remote set up information.

(3-8)
The method of using a server connected with a network according to (3-3), wherein the equipment information obtained from the image forming apparatus includes one or more pieces of information selected from information of the image forming apparatus structure, information of data carried by the image forming apparatus and information of operation of the image forming apparatus.

(3-9)
The method of using a server connected with a network according to either one of (3-1)–(3-6), wherein the server provides one or more of web service, FTP service and mail service.

(3-10)
The method of using a server connected with a network according to (3-1), wherein, based on statistical information obtained from plural image forming apparatuses connected to the server and processed on the image forming apparatus side, data corresponding to the statistical information are delivered to the image forming apparatus through the server.

(3-11)
The method of using a server connected with a network according to (3-1), wherein, based on statistical information obtained from plural image forming apparatuses connected to the server and processed on the server side, data corresponding to the statistical information are delivered to the image forming apparatus through the server.

(3-12)
The method of using a server connected with a network according to (3-1), wherein data are delivered to an image forming apparatus having no statistical information.

(3-13)
A server system wherein the method of using a server connected with a network described in either one of (3-1)–(3-12) can be executed.

In the invention, when the state of using a template, the state of using software and sales information, for example, are combined periodically to be analyzed, or when classification is made by a season, an area and the distinction of sex and age of an orderer, there are brought effects that a term of development for new software or data can be shortened, a chance for profit is expanded for an output center or a mini-lab using an output image apparatus, and an orderer for output is favored. Further, for an operator using an output image apparatus, the output image apparatus is stabilized and facility is improved.

The network in this case means one which mutually connects computer systems, terminals and data communication facilities. Connection may be either wire connection using private lines or public lines, or wireless connection through a communications satellite or connection of mixture of them. Further, if the connection is practicable at any time, constant connection is not necessary. Delivering in this case means that data are transferred from a server on a network to another server connected to the network, terminals and data communication facilities, automatically or manually. Data in this case mean total digitized data such as software for each processing section constituting an image forming apparatus, templates to be outputted and information handled by various image forming apparatuses or servers, unless otherwise provided.

The image forming apparatus in this case is one wherein digital data or analog data are outputted on a two-dimensional object such as, for example, a plain paper, a specialized image receiving paper and a photographic paper, or one wherein images and/or characters are outputted on the surface of a three-dimensional object. A system therefor includes an ink jet system, a laser system, a sublimation system, a thermal transfer system, an electrostatic system, a dot impact system, a liquid crystal shutter system, thermo-auto-chrome system, an LED (light emitting diode) system, a VFPH (fluorescent display print head) and a CRT (cathode ray tube) system.

Statistical information (information about the state of the image forming apparatus) obtained from the image forming apparatus includes one or more pieces of information selected from image forming apparatus operation information, information of using data operated on the image forming apparatus, image information used by the image forming apparatus, customer information, store information, sales information, apparatus maintenance information, error history information, failure log information and remote set up information.

The image forming apparatus operation information in this case represents information of established values for various processing sections constituting the image forming apparatus, information and history of the information outputted by each sensor provided on the image forming apparatus, or history of operations done by each processing apparatus are meant, and on the example which will be stated later, represents information about the number of working hours of the image forming apparatus per day, an amount of prints from analog media, an amount of prints from digital media, sizes of outputted prints, an amount of evaporation of moisture of processing agents and types of analog media used. Further, the information of working hours represents, for example, the time when the image forming apparatus was turned on and the time when the power supply was cut, while, the types of analog media represent information about a size of an image plane of a photographic film, a photographic film maker and sensitivity.

The information of using software operated on the image forming apparatus represents operation-starting time, operation-ending time and accumulated usage time for software operated inside the image forming apparatus or operated on a peripheral image processing apparatus connected to the image forming apparatus, such as software for printing only one sheet of image data at a time, or software for composing plural image data. Further, it may be preferable that the information includes information as to which type of image processing is used on the software.

The image information used by the image forming apparatus represents information of images outputted by the image forming apparatus which includes, for example, a template, a size of image data requested by an orderer, a compression method, a form of data and the number of times for output of image data within a certain period of time.

The customer information in this case represents information of an orderer of image data outputted by the image forming apparatus, representing one or more pieces of information selected from a name, a zip code number, an address, information of longitude and latitude of the address, a wire telephone number, a FAX number, wireless telephone (portable telephone, PHS) number, an electronic mail address, URL, an age, the distinction of sex, a date of birth, an occupation, a blood type, a hobby and a family make-up.

The store information represents information of a store where the image forming apparatus is installed, representing one or more pieces of information selected from a name of a manager of the store, a zip code number of the store, an address, information of longitude and latitude, a wire telephone number, a FAX number, wireless telephone (portable telephone, PHS) number, an electronic mail address, URL, delivery information for consumables, information about a person in charge of sale and information about a person in charge of maintenance.

The sales information includes information of order for output, information about an amount of output and a type of medium used for the output, information about a size of an outputted print, information about the number of outputted print sheets and information about a price per a sheet of print sold.

The apparatus maintenance information represents information about maintenance and repair of the image forming apparatus such as, for example, information showing when was inspection made, when were parts replaced, and when was cleaning conducted.

The error history information represents information wherein an error code was recorded together with a date of error occurrence when the image forming apparatus detected the erroneous operation which is estimated or is not estimated from specifications.

The failure log information represents information wherein the state of the apparatus at the moment of failure occurrence and thereabouts and the error code were recorded together with a date of failure occurrence.

The remote set up information represents information showing the state of the image forming apparatus including, for example, information about the state of an output engine showing whether an output is possible or not, the state of conveyance for an outputted object, residual quantity of consumables to be used, a size of an outputted object, a position, surface information, external environment (temperature, humidity, inclination, vibration and sound volume) for the installed image forming apparatus and correction information for density, gradation and pixel of an outputted object prepared by the image forming apparatus.

Further, the invention is a method of using a server connected with a network, which makes it possible to deliver the data corresponding to statistical information to an image forming apparatus based on statistical information obtained through the server from plural image forming apparatuses connected to the server and processed on the image forming apparatus side.

Further, the invention is a method of using a server connected with a network, which makes it possible to deliver the data corresponding to statistical information to an image forming apparatus based on statistical information obtained through the server from plural image forming apparatuses connected to the server and processed on the server side.

Further, the invention is a method of using a server connected with a network, which makes it possible to deliver the data to an image forming apparatus.

Further, the invention is a method of using a server connected with a network, which is characterized in that the server delivers data to a specific image forming apparatus, then receives information of the state of operation of the image forming apparatus in which the data are installed, and delivers the aforesaid data to other image forming apparatuses in accordance with the information of the state of operation. This information of the state of operation means information showing whether the image forming apparatus is operating in accordance with specifications based on statistical information or not.

Further, the invention is a method of using a server connected with a network, which is characterized in that the server delivers, based on equipment information obtained through the server from each image forming apparatus connected to the server, the data corresponding to the foregoing.

Equipment information obtained from the aforesaid image forming apparatus includes one or more pieces of information selected from mechanical structures of an image forming apparatus, data installed in an image forming apparatus, information of the state of operation of an image forming apparatus.

The mechanical structures of an image forming apparatus in this case, mean each processing section constituting an image forming apparatus including, for example, an image inputting section, a frame memory, an image processing section, an output engine, a conveyance section, a developing section, a system control section, CPU section and peripheral equipment for the image forming apparatus.

The data installed in an image forming apparatus include software for controlling the processing sections stated above, template data and digitized data of information handled by various types of image forming apparatuses or the server, and in particular, the software for controlling the processing sections is typical.

Further, the invention is a method of using a server connected with a network, which is characterized in that each image forming apparatus connected to the server transmits a request for updating functions to the server, and data for updating function are delivered from the server to the image forming apparatus which requested updating of functions. The function updating in this case means updating for expanding and improving the function maintained currently by an image forming apparatus or peripheral equipment, or updating for limiting the function maintained currently by the aforesaid apparatus and equipment.

Further, the invention is a method of using a server connected with a network, which is characterized in that data are automatically delivered to the specific image forming apparatus, then, information of the state of operation of an equipment in which the aforesaid data are installed is automatically received, and the aforesaid data are automatically delivered to other equipment in accordance with the information of the state of operation.

Further, the invention is a method of using a server connected with a network, which is characterized in that information of a combination of data showing that each image forming apparatus connected to the server can operate is stored in the server.

Further, the server stated above offers either one or more of services including web service, FTP (file transfer protocol) service and mail service. The server in this case means a computer which holds application, file or memory shared by a user on the network, or a processor.

A web server which conducts web service is one of TCP/IP services, and is a server equipped with protocol (details are RFC2068) for conducting Hypertext transmission in a network, and service offered by the use of the web server is called web service.

An FTP server which conducts FTP service is one of TCP/IP services, and is a server equipped with protocol (RFC0959) for conducting file transmission in a network, and service offered by the use of the FTP server is called FTP service.

A mail server which conducts mail service is one of TCP/IP services, and is a server equipped with protocol (details are RFC0821) for conducting electronic mail transmission in a network, and service offered by the use of the mail server is called mail service.

Data delivered or transmitted in these service are basically digital data, and in the case of transmission, it is preferable to conduct data compression because load for the network is great. Further, for preventing a disclosure of data contents or illegal use of literary works, it is preferable that text data are encoded, and an electronic watermark is used for image data.

The server stated above is one which offers at least one of web service, FTP service and mail service, and with regard to data transmission between servers, it is also possible to use remote copy command (rcp) in addition to the aforesaid service.

Further, the invention represents a server system wherein a method for using a server connected to a network can be executed.

An image recording section is a part of the image forming apparatus, and it is a section where outputting is conducted on a recording medium.

A conveyance section is a part of the image forming apparatus, and it is a section which conveys a recording medium.

A developing section is a part of the image forming apparatus, and it is a section where those outputted on a recording medium are visualized.

An image inputting section is a part of the image forming apparatus, and it is a section where data for outputting on a recording medium are inputted.

An operation section means a user interface section and a control section which are mainly operated by an operator who handles the image forming apparatus.

A maintenance section means a user interface section and a control section which are mainly operated by a maintainer who conducts maintenance, inspection and repair for the image forming apparatus.

A session section is a control section for generalizing and controlling plural software which control the image forming apparatus efficiently.

In the image forming apparatus, all section stated above may be provided, or the developing section or the like may be omitted, depending on a recording system.

The area in this case is a positional range wherein a service base can give service, and its example includes different countries, prefectures and cities.

BRIEF DESCRIPTION OF THE DRAWINGS

FIG. 12 is a diagram showing types of information.

FIG. 13 is a diagram showing types of information.

FIG. 14 is a diagram showing types of information.

FIG. 15 is a diagram showing types of information.

FIG. 16 is a diagram showing types of information.

FIG. 17 is a diagram showing types of information.

FIG. 18 is a diagram showing types of information.

DETAILED DESCRIPTION OF THE PREFERRED EMBODIMENT

Figure 1:
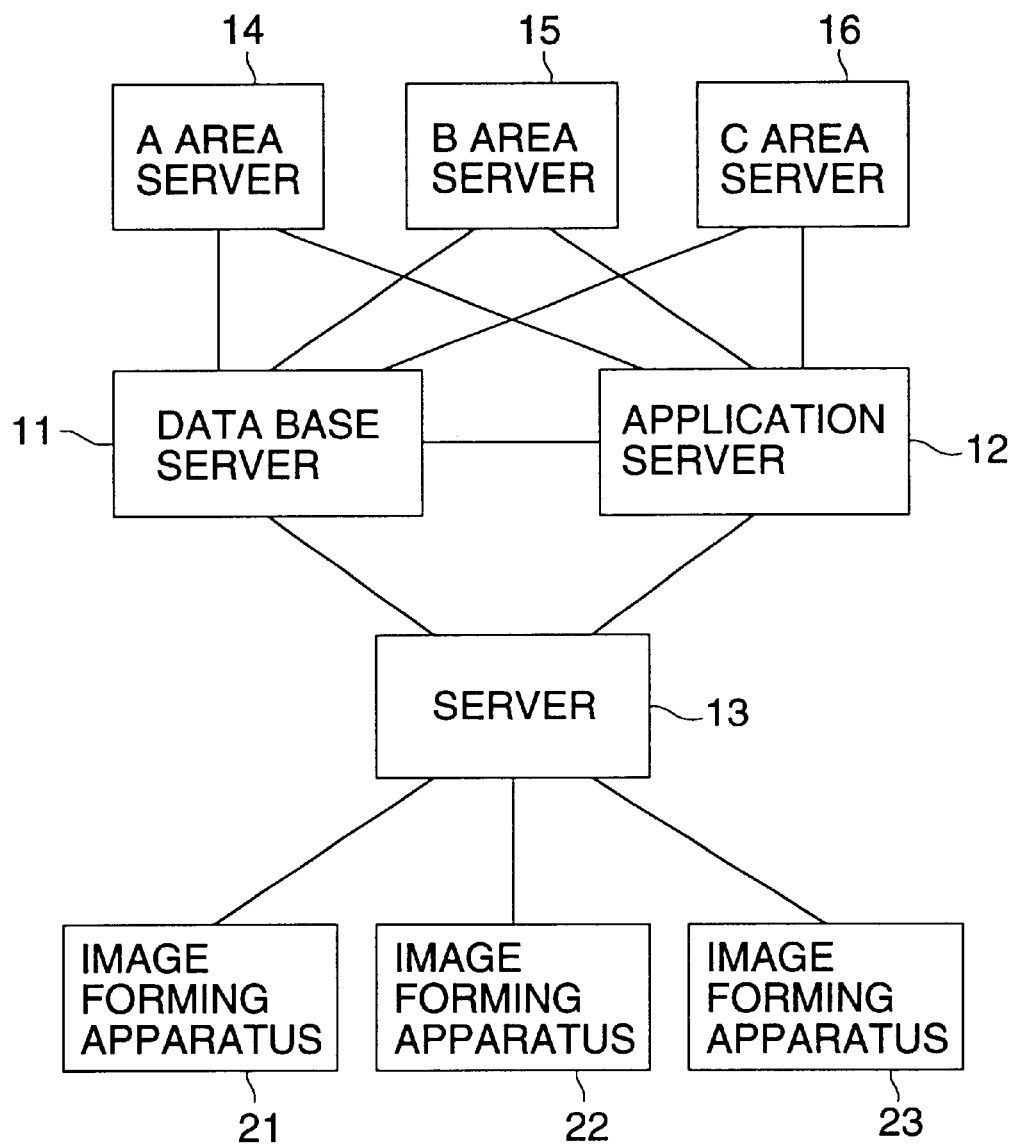
FIG. 1 is a connection diagram showing conceptual connection between a server and an image forming apparatus on a network.

An embodiment of the invention will be explained as follows, referring to the drawings. FIG. 1 is a connection diagram which shows an embodiment of the invention and shows conceptional connection of a server and an image forming apparatus on the network. As shown in the diagram, plural image forming apparatuses 21, 22 and 23 are connected to data base server 11 and application server 12 through web server 13 on the network connected through a network.

Figure 19:
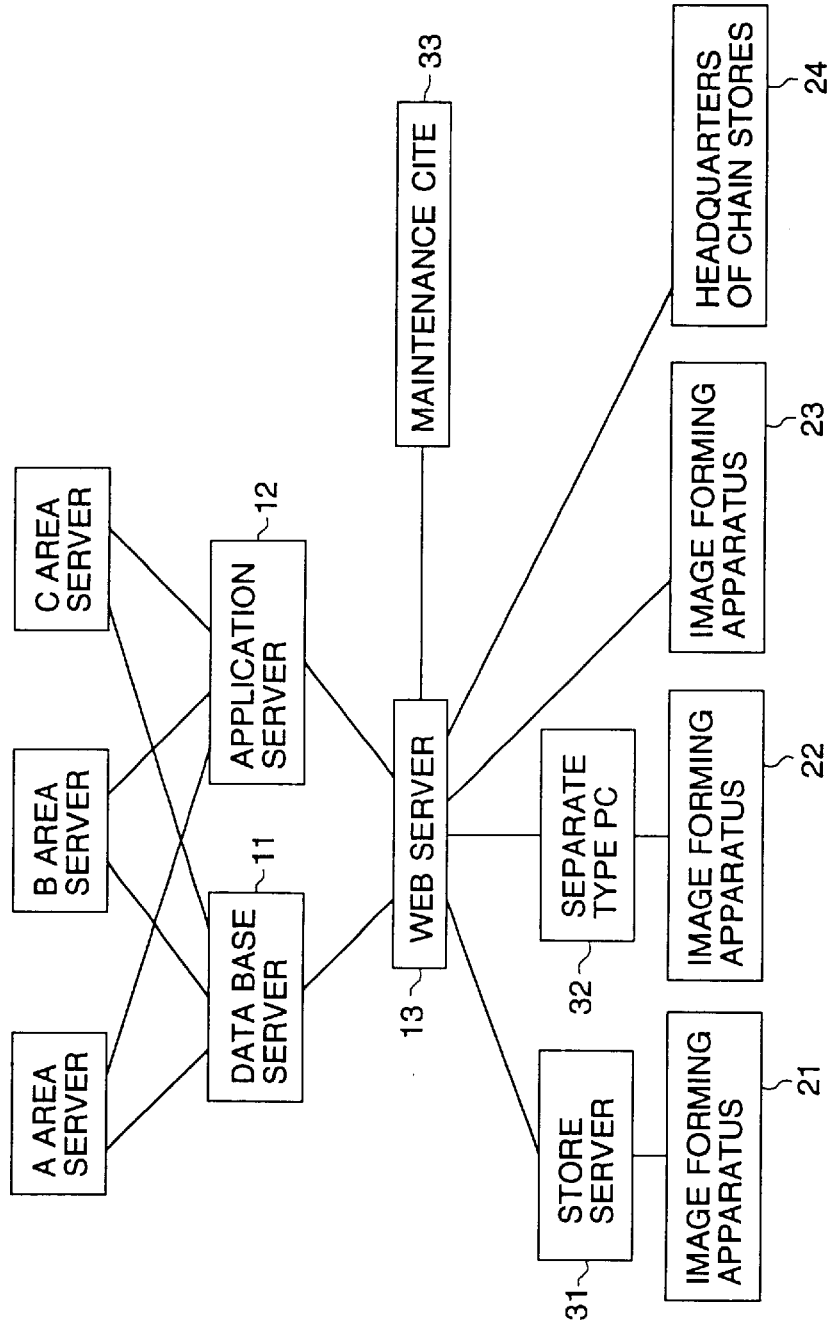
FIG. 19 is a connection diagram showing conceptual connection between a server and an image forming apparatus on a network.

Incidentally, as shown in FIG. 19, in the connection between an image forming apparatus and a web server, even when they are connected through store server 31 installed in a mini-lab store or through PC 32 of a separate type which serves as an auxiliary image processing means of the image forming apparatus, these store server 31 and PC 32 can be regarded substantially as the same object.

Image forming apparatuses 21, 22 and 23 are used in a mini-lab which gives photographic print service, and they are usually installed and operated in different locations. Each of image forming apparatuses 21, 22 and 23 is structured so that it can conduct at high speed developing and printing for a negative film representing a silver halide film which have been conducted through software for image forming control use and image processing use, needless to say, printing from a hard copy representing a reflection type document such as a positive films, photographic prints and printed matters, as a matter of course, printing from compact flush, smart media, memory stick, multimedia card, photo-electromagnetic disk, PCMCIA standard card, CD-ROM, CD-R, DVD, floppy disk, and media wherein an image is stored after being digitized such as Zip, and printing of image information from an electronic camera.

The data base server 11 stores data statistical information, information of the state of operation and equipment information all concerning image forming apparatuses 21–23, then, data are delivered from the installation side of the image forming apparatus, and storage, or updating, if necessary, can be conducted in succession.

With regard to information accumulated here, information from headquarters 24 of chain stores and from maintenance cite 33 can also be accumulated and updated, in addition to information transmitted from an image forming apparatus.

By conducting statistical processing based on sales information accumulated here, it is possible to prepare information showing which types of prints are made most by each image forming apparatus, when is a busy time zone, and what is the most popular template. It is further possible to control consumable materials used for prints.

Application server 12 stores therein software for image forming apparatus control use and software for image processing used for printing of images on an image forming apparatus, in the executable form or in a source code form. Further, data used in printing images with image forming apparatuses 21, 22 and 23, for example, frame data for photographic printing called a template are also stored. These software and data are updated when they are corrected or registered again based on information accumulated in the data base server. It is also possible to make the popular templates and to register them on priority basis, based on sales information.

Web server 13 is connected to each of image forming apparatuses 21, 22 and 23 through a general-purpose network, for example, an internet, or connection using public lines by dial-up, or direct connection by private lines, by the use of communication service such as the aforesaid HTTP service, TCP/IP service, FTP service and mail service.

In accordance with request from image forming apparatuses 21–23, prescribed data can be delivered from the data base server 11 through web server 13, and data of the prescribed software can be delivered from the application server 12. It is also possible to transmit prescribed data from each image forming apparatus to the data base server 11 and the application server 12 so that the data are stored in each of the servers 11 and 12. On the contrary, even when no request is advanced from the image forming apparatuses 21–23, it is possible to deliver automatically from the data base server 11 and application server 12 to the image forming apparatuses 21–23 through server 13.

Incidentally, it is possible to arrange a personal computer (PC) or a separate server, to be subordinate to each of the image forming apparatuses 21–23, between each of the image forming apparatuses 21–23 and web server 13, and thereby to operate PC for connection with internet in each image forming apparatus, or to conduct automatically the connection between them with a separate server.

The data base server 11 and the application server 12 can be connected to a server installed in other area, for example, in other country, for example, each of A-area server 14, B-area server 15 and C-area server 16, thus, data concerning image forming apparatuses and data of software can be obtained from or delivered to plural areas, for example, to plural countries.

Incidentally, these data base server 11, application server 12 and web server 13 have only to be divided in terms of function, and they can further be controlled by on CPU, depending on data size.

Operations of the present embodiment as those stated above will be explained. First, the data base server 11 obtains statistical information of the image forming apparatus, information of the state of operation and equipment information in plural image forming apparatuses 21–23 from each image forming apparatus through web server 13, and stores these information. These pieces of information include the following concretely, but the invention is not limited to these information.

(1) Information showing the part damaged in an image forming apparatus. When information of this kind is stored as the equipment information, the information can be utilized as information for repair and maintenance. For example, by using as statistical data for frequency of troubles on a specific portion, it is possible to estimate the life of that portion.

Further, by collecting information of parts which get out of order frequently, it is possible to prevent troubles of image forming apparatuses which have had no troubles.

(2) Error log information such as information showing the location in an image forming apparatus where a recording sheet to be recorded by the image forming apparatus is jammed. This can be used as information for repair and maintenance relating to the conveyance section.

It is further possible to conduct error prevention and diagnosis for the image forming apparatus including the conveyance section.

(3) Information concerning a color of a print made by an image forming apparatus. Due to this, it is possible to control the finished color of the print, and information of this kind can be used for development of software for image processing.

When information about finish of prints is statistically controlled, it is possible to keep finished image quality of the corresponding image forming apparatus to be constant by reviewing information of operation of the image forming apparatus, when the finish of prints is deviated from the standard. Further, by making subjective evaluation of users for finished image quality to be a data base from a maintenance site, it is possible to use it for development of software for image processing.

(4) Information concerning an amount of residual consumables for making prints in image forming apparatus. Due to this, it is possible to grasp residual quantity of toner, developing agents for silver halide films and silver halide color photographic paper and paper for prints, and thereby to prepare in advance when the residual quantity decreases. Further, since an amount of consumption of total consumables for image forming apparatuses 21–23 can be grasped, this can be used as data for production and supply of these consumables.

For example, based on information concerning a residual amount of paper and information concerning the number of prints included in paper channel information transmitted to a data base server by an image forming apparatus, and on an amount of paper shipped to a photofinishing lab having an image forming apparatus, it is possible to obtain information about a residual amount of consumables for print making in the image forming apparatus, and this information is accumulated. Due to this, it is possible to grasp a residual amount of paper and processing agents, and to prepare for consumables running short before they are gone, by giving the image forming apparatus previous notice, if consumables run short. Since it is possible to grasp an amount of consumption of not only one image forming apparatus but also total image forming apparatuses, the amount of consumption is also used for data of production and supply of consumables.

(5) Information concerning the number of hours for which the image forming apparatus has been used. Information of this kind makes it possible to know frequency for the use of an image forming apparatus, and it is useful, together with the aforesaid information, for controlling sales and parts. It further makes it possible to estimate a degree of wear of each part, and it is useful in preparation for replacement and repair of the parts.

For example, accumulated operation time of a lamp of a film scanner is accumulated in a data base server. Then, lighting time per day is calculated by the data base server based on the accumulated operation time of a lamp of a film scanner, which makes it possible to calculate a life of a lamp of a film scanner. Due to this, it is possible to estimate a life for usage of a lamp of a film scanner on a considerable exactness, and thus, it is possible to procure a spare lamp before a lamp in use burns out, by notifying an image forming apparatus of a lamp life, in a photofinishing lab having an image forming apparatus.

(6) Information concerning the number of sheets and size of the prints made by the image forming apparatus. This can be used for the control of sales. It may be preferable that this information is transmitted to the data base after the image forming apparatus conduct the statistic process for this information (7) Information concerning a template (a photograph formwork or a background photograph) which is used by an image forming apparatus to make a print. Due to this, the server can obtain information showing templates which are popular among consumers, and the information can be useful for future delivery of templates and for development (making) and preparation of templates. It is preferable that this information is made to be a statistic by an image forming apparatus and then is transmitted to the data base server.

(8) Information (sales control information) showing the image forming apparatus and an amount of prints made by that image forming apparatus. This can be useful for sales control for each image forming apparatus or for each photofinishing lab. It is preferable that this information is made to be a statistic for each image forming apparatus.

(9) Information concerning the place where the print was made. This makes it possible to obtain data in the area where each image forming apparatus is installed, and the data can be obtained by classifying them by area.

For example, at the data base server, based on the sales control information stated above, it is possible to obtain data including locations, types of prints and a quantity of prints for each area where each image forming apparatus is installed, and to prepare and accumulate the information by classifying the data for each area and by making them to a statistic.

(10) Information concerning the amount of consumables used for making prints by the image forming apparatus. This can be useful as information for preparation and supply of consumables.

For example, paper usage data of application setting data in FIG. 16 and ECO-JET (developing agents) usage amount data deserve. Further, the information mentioned above can be made to be a statistic by plural image forming apparatuses, and the information can be utilized more efficiently.

Next, software for controlling an image forming apparatus stored in the application server 12 is one to control, for example, printing speed, conveyance speed of paper for prints, temperature of a processing solution, a replenishing amount of processing solution, an amount of processing gents to be supplied, a paper width, a width of paper feeding and the state of sensors, and it is developed by a person in charge of development, so that the latest one is stored in succession. By accessing the application server 12 through web server 13 on the each image forming apparatus side in case of need, the latest one can be obtained. Further, on the application server 12, it is possible to use for revision or new development of the software, by obtaining various types of information about the state of image forming apparatuses stated above from each image forming apparatus. Further, based on these information, the software can be corrected and modified automatically, and can be developed automatically. It is further possible to obtain software for controlling a printer from servers 14, 15 and 16 installed in other countries, and thereby to utilize software in other country effectively.

Further, in the application server 12, there are stored data of software for image processing on the image forming apparatus, and when accessing the application server 12 through web server 13 from the image forming apparatus side in case of need, the latest software for image processing can be obtained. The software for image processing is used, for example, for an optical mechanism for forming image information on paper for a print, a lookup table, paper a channel, film channel, filter mode, resolution and for control for judgment of a type of input film. Further, by obtaining various types of information as those stated above from each image forming apparatus with regard to the application server 12, it is possible to utilize them for software modification or development of a new software. In addition, based on these information, software can be corrected and modified automatically, and new software can automatically be developed. It is further possible to obtain software for image processing from servers 14, 15 and 16 installed in other countries, and thereby to utilize software in other countries effectively.

It is possible to make data of software for image processing to include image data of templates, and each image forming apparatus can obtain information of templates on an internet in accordance with orders from customers, which makes it possible to obtain the same effect as of having abundant data of templates. Since it is also possible to process print images to image data of template, data of templates of many kinds can be provided to customers.

As stated above, in the method in the present embodiment to use servers connected to an internet, it is possible to send or receive various information concerning an image forming apparatus on a general internet between image forming apparatuses 21–23 and a group of data base server 11 and application server 12. Therefore, this information can be used efficiently on the part of the image forming apparatuses 21–23 as well as on the part of the servers 11 and 12, which makes control of image forming apparatuses and development and supply of software to be conducted efficiently.

Figure 2:
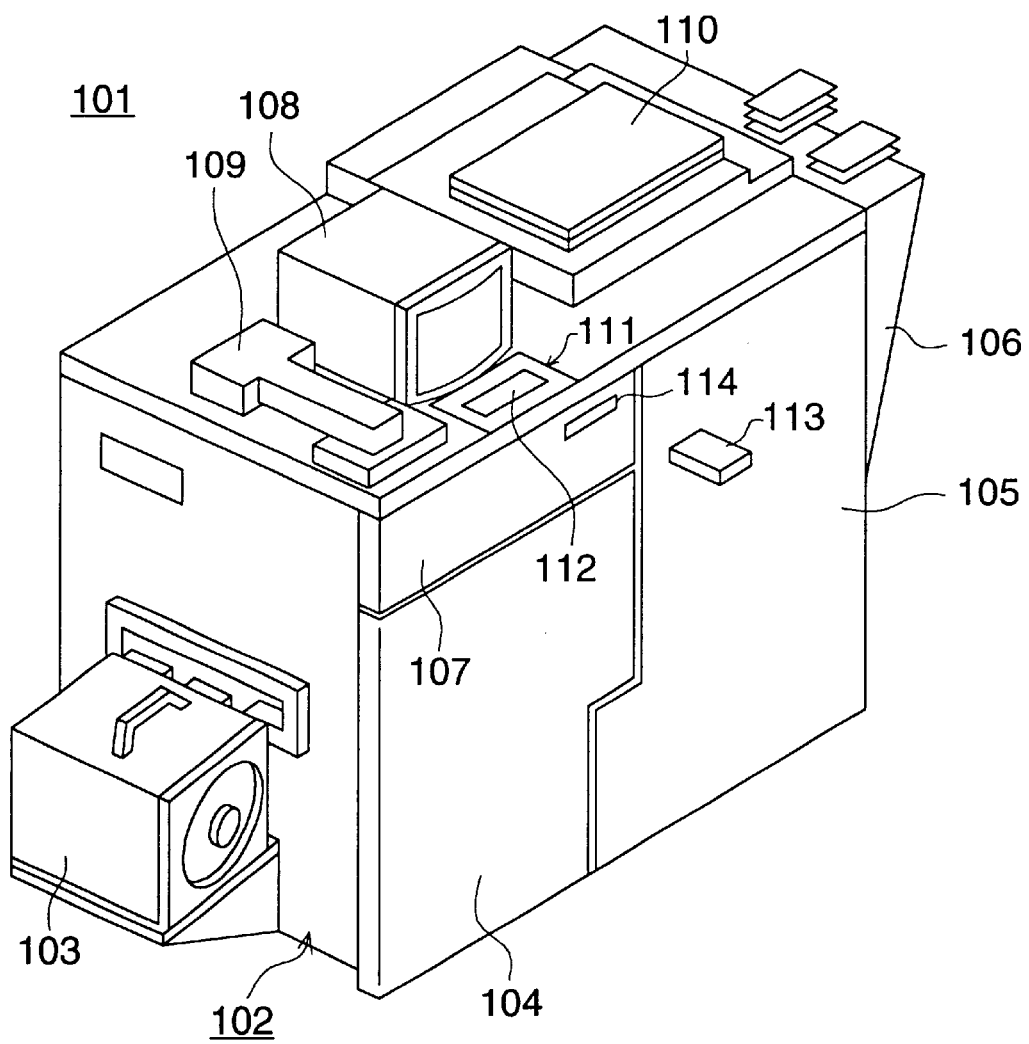
FIG. 2 is a perspective view of an image forming apparatus.
Figure 3:
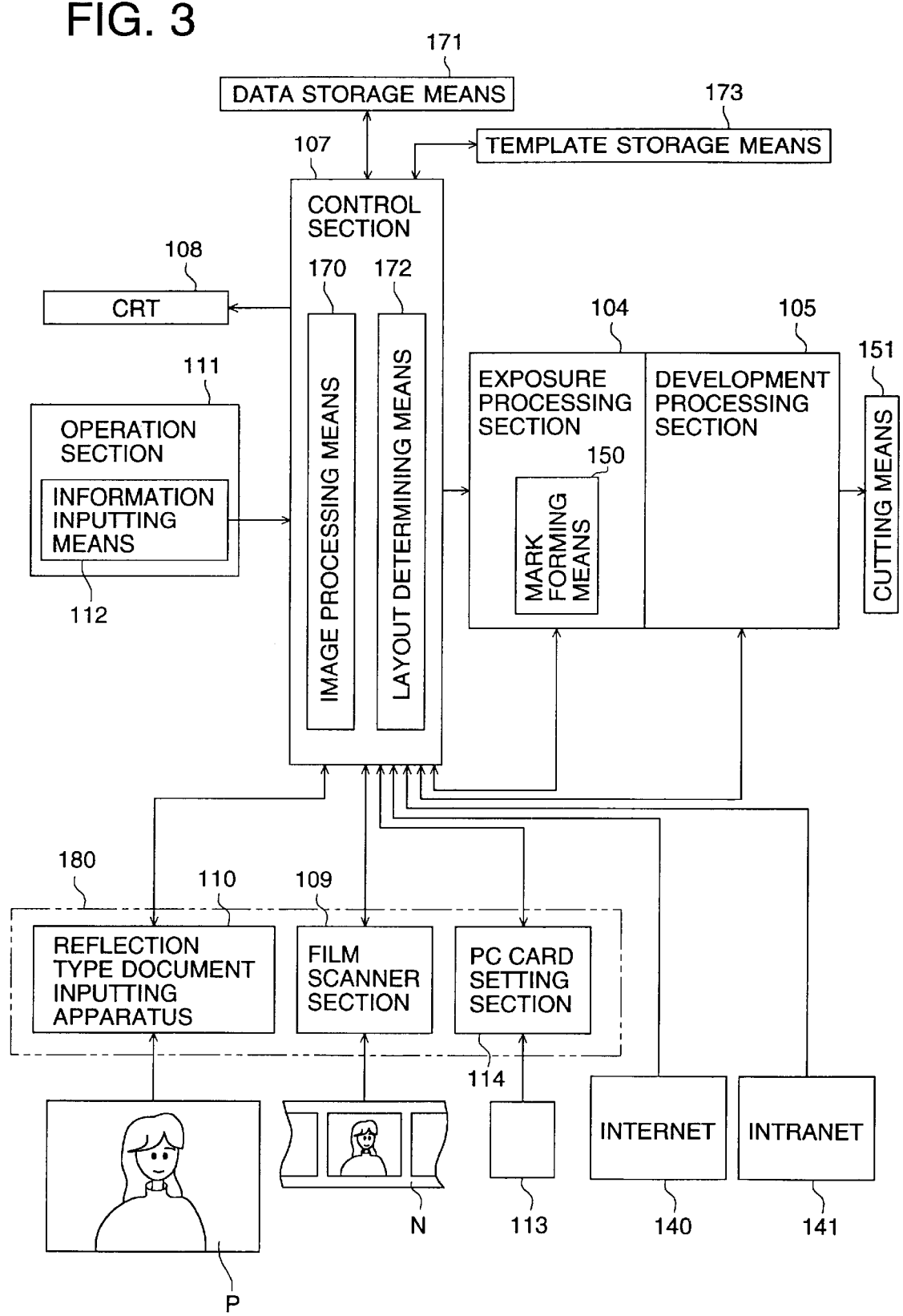
FIG. 3 is a schematic structure diagram of in image forming apparatus

Next, concrete embodiments of the image forming apparatuses 21–23 are shown in FIGS. 2 and 3. FIG. 2 is a perspective view of an image forming apparatus. As an image forming apparatus in this case, there is illustrated an apparatus wherein a silver halide light-sensitive material representing a recording medium is subjected to exposure by a light source such as a laser, CRT (cathode ray tube), VFPH (fluorescent character display tube print head) and LED, then, developing is conducted and a print is made. Though the method of using a silver halide light-sensitive material is most preferable from the viewpoint of image quality, any type which can make a print based on image data is acceptable, and an image forming apparatus of a type of heat sensitive recording and ink jet system or of an electrophotographic system, for example, is also acceptable.

Image forming apparatus 101 of the present embodiment has, on the left side of its apparatus main body 102, magazine loading section 103 where silver halide light-sensitive materials are loaded, and in the apparatus main body 102, there are provided exposure processing section 104 which conducts exposure on a silver halide light-sensitive material representing a long type recording medium and development processing section 105 which develops exposed silver halide light-sensitive material and dries it, and a print thus made is cut by a cutting means to be ejected on tray 106 provided on the right side of the apparatus main body 102. Further, inside the apparatus main body 102, there is provided control section 107 on the upper position of exposure processing section 104.

On the top of the apparatus main body 102, there is arranged CRT 108. Film scanner section 109 representing an apparatus for reading a transmission type document is arranged on the left side of CRT 108, and reflection type document inputting apparatus 110 is arranged on the right side of CRT 108. On the front side of CRT 108, there is arranged operation section 111 which is provided with information inputting means 112, and a touch panel, for example, constitutes the information inputting means 112.

At the position of control section 107 on the apparatus main body 102, there is provided PC card setting section 114 into which PC card 113 can be inserted, and PC card 113 has a memory in which image data for plural frames photographed by a digital camera are stored.

Incidentally, a PC card having a memory storing frame image data represents a flush ATA card, a compact flush card and smart media connected to a PC card adapter.

Further, the image forming apparatus 101 of the present embodiment can collect image data from a network, and it can collect image data through, for example, an internet or an intranet.

Incidentally, CRT 108, film scanner section 109, reflection type document inputting apparatus 110, PC card setting section 114 and operation section 111 are provided solidly with the apparatus main body 102, either one or more of them may also be provided separately. In this case, the image forming apparatus 101 is treated as a print making system.

FIG. 3 is a schematic structure diagram of an image forming apparatus. The image forming apparatus has frame image inputting means 180 which inputs frame image data from a recording medium. The frame image inputting means 180 is composed of film scanner section 109, reflection type document inputting apparatus 110 and PC card setting section 1214, and it inputs frame image data from a recording medium such as negative film N, print P and PC card 113.

Control section 107 of the image forming apparatus reads document information coming from film scanner section 109 or from reflection type document inputting apparatus 110, based on command information from information inputting means 112, and obtains image data to display on CRT 108. As a document read by film scanner section 109, a photographic light-sensitive material is common, and as the photographic light-sensitive material, there given a color negative film and a color reversal film, and an image recording on a transparent base or on a translucent base is acceptable. A document read from reflection type document inputting apparatus 110 includes any document representing a reflection type document such as prints, naturally, printed matters and pictures. It is possible for a film scanner of film scanner section 109 to transform into digital information to made frame image information. When the photographic light-sensitive material is a color photographic paper, it is possible for a flat bed scanner of the reflection type document inputting apparatus 110 to make frame image information.

Further, the image forming apparatus of the present embodiment can collect image data from a network, and it can input image data through, for example, internet 140 or intranet 141.

It further has data storage means 171 and template storage means 173. In the data storage means 171, image data and order information including an orderer for prints, print sizes and the number of prints corresponding to the image data are stored, and they are accumulated in succession in a unit of an order from an orderer. For example, from film scanner section 109, there are inputted frame images coming from the processed negative film N, while from the reflection type document inputting apparatus 110, there are inputted frame images coming from pint P which is obtained by printing frame images on a photographic paper and by processing. Further, in the data storage means 171, image data inputted from internet 140 or intranet 141 and order information including an orderer for prints, print sizes and the number of prints corresponding to the image data are stored, and they are accumulated in succession in a unit of an order from an orderer.

In template storage means 173, there are stored, in advance, data of at least one template which establishes a background image and a composing area, and an operator selects an appointed template from plural templates stored in the template storage means 173 through operation and setting, thus, frame image information is composed by the selected template, and a print of the inputted frame image information is made. This composition by means of a template is conducted through a chromakey method which is widely known.

The control section 107 has image processing means 170 and layout determining means 172. In the control section 107, image data are subjected to image processing, and image data for exposure are formed.

In the layout determining means 172, there is determined a layout of images recorded on a long type silver halide light-sensitive material based on information of print sizes and the number of prints made based on image data, and after accumulating the image data, they are laid out to match the nature of the succeeding steps. For this layout, it is preferable to employ the most efficient layout method using a wide type light-sensitive material, for example, to conduct automatic layout so that white margin section may be minimum. It is also possible to conduct layout so that the layout may match XY cutter automatically. As a method to determine layout, it is possible to use methods described in TOKKAIHEI Nos. 10-293857 and 10-293856.

Though the layout determining means 172 is provided on the control section 1-7 in the present embodiment, the data storage means can act for the layout determining means, or a specialized terminal which conducts layout operations may be provided.

At the exposure processing section 104, a silver halide light-sensitive material is subjected to exposure of images, and plural images are recorded on a long type light-sensitive material based on the determined layout information. Further, the exposure processing section 104 has mark forming means 150 which forms, on a long type light-sensitive material, a mark for cutting the long type light-sensitive material based on layout information. For example, marks are formed by recording through exposure at four corners corresponding to a sheet of print, on a silver halide light-sensitive material.

The marks for cutting a long type light-sensitive material which are formed by recording through exposure on a long type light-sensitive material, for example, make it possible to cut automatically using these marks which serve as a reference. Further, marks may also be formed by punching holes on a silver halide light-sensitive material.

In the development processing section 105, exposed silver halide light-sensitive materials are subjected to development processing and dried, then, a print on which plural sheets are recorded is made, and it is cut by cutting means 151 into an individual print to be outputted. The cutting means 151 is an XY cotter, for example, and it cuts plural images allocated on a long type silver halide light-sensitive material based on information generated by the layout determining means 172 into an individual print.

FIGS. 12–18 show types of information used when image forming apparatus is connected as an image forming apparatus on a network of FIG. 1.

Information used in this way is treated basically with text data, but maintenance information collected from established data of each device and from each device is treated with text data as a binary form. Therefore, a file size is not fixed, and it is a variable size representing a size as a target.

Figure 4:
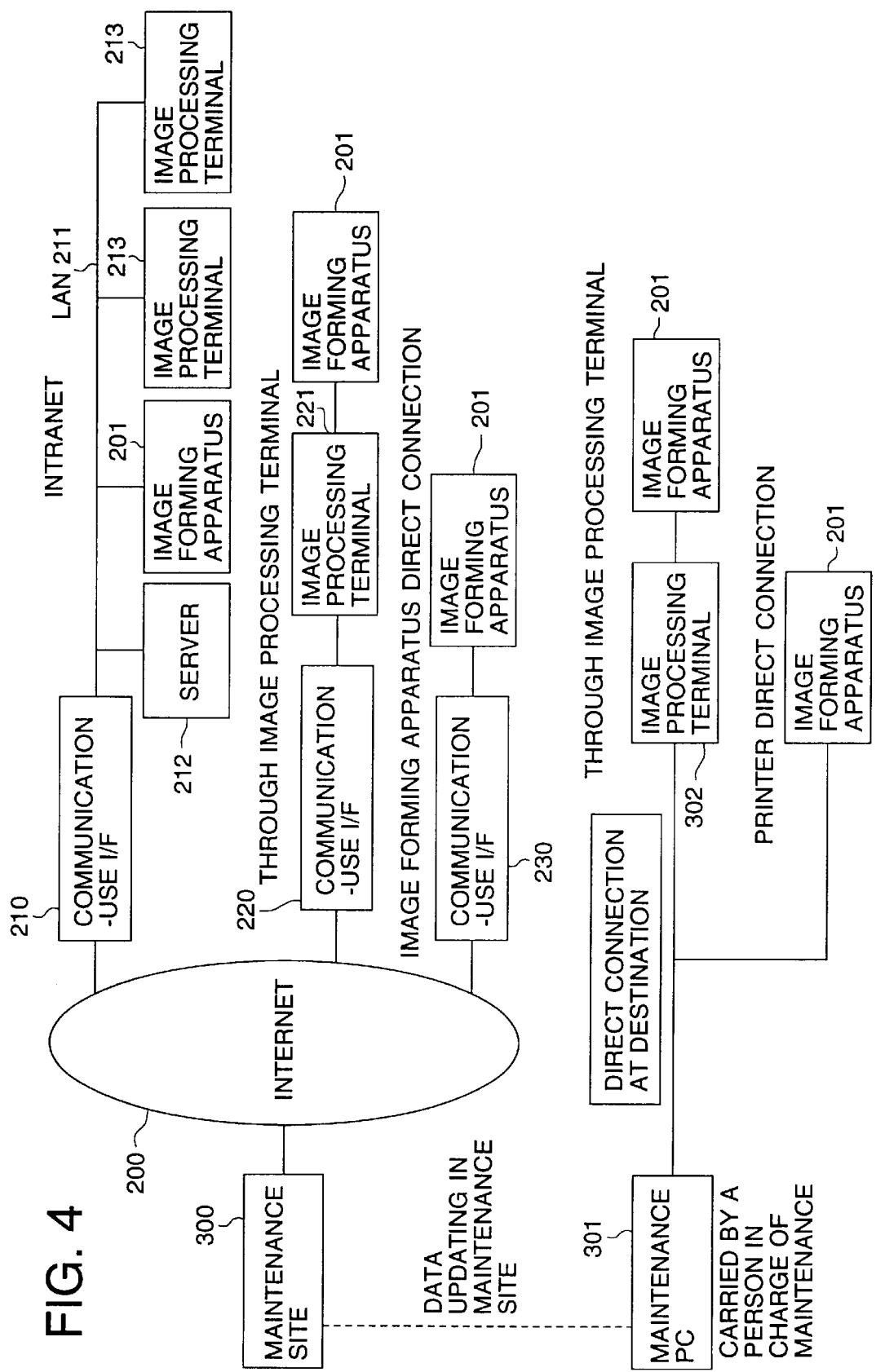
FIG. 4 is a connection diagram showing conceptual connection between a server and an image forming apparatus on a network.

A method of using a server connected to a network and a server system both in the invention may also be structured as shown in FIG. 4. In the present embodiment, image forming apparatus 201 connected to the inside of intranet is connected to internet 200 through communication-use I/F 210, further, image forming apparatus 201 is connected through communication-use I/F 220 by image processing terminal 221, and image forming apparatus 201 is connected directly through communication-use I/F 230.

An intranet is structured to be connected with server 212 with LAN 211, image forming apparatus 201 and with image processing terminal 213. The intranet is one connected to the same network segment, and it means the state to be connected by the network which is inside a communication-use interface which communicates with an external network, which is sometimes called an intranet in general.

Further, for connection with internet 200 from communication-use I/F 220, 220 and 230, a modem (analog public lines), TA, router (ISDN), vehicular communication network of specialized I/F, private lines for internet and cable television can be used.

Incidentally, the server is one including data base server 11, application server 12 and web server 13 all in FIG. 1. Each of area server A, area server B and area server C in FIG. 1 is connected to the server through internet 200.

Further, in the present embodiment, using a server connected to a network includes one connected to a substantial network which is off normally and is connected occasionally, or one which is connected intermittently. The embodiment shown in FIG. 4 shows, for example, an occasion wherein a person in charge of maintenance connects directly at the site visited by the person. To internet 200, there is connected maintenance site 300, and maintenance PC 301 used by a person in charge of maintenance is connected to image forming apparatus 201 through image processing terminal 302, or it is connected directly to image forming apparatus 201, so that data may be updated in maintenance site 300. As a method of connection between maintenance PC 301 and image forming apparatus 201, there are given a serial port such as RS-232C, a parallel port and LAN.

With regard to a method for updating data, if data to be updated are transmitted as they are, when transmitting the data from maintenance site 300 through internet 200, there is caused great load in terms of transmission time and an amount of line connection charge. It is therefore preferable to conduct data compression by using Huffman coding. In this case, further coding is preferable for preventing data disclosure, and it is possible to use one known as PGP (Pretty Good Privacy). It is further preferable to use an electronic watermark for preventing the registered template or for utilizing as accounting information.

Figure 5:
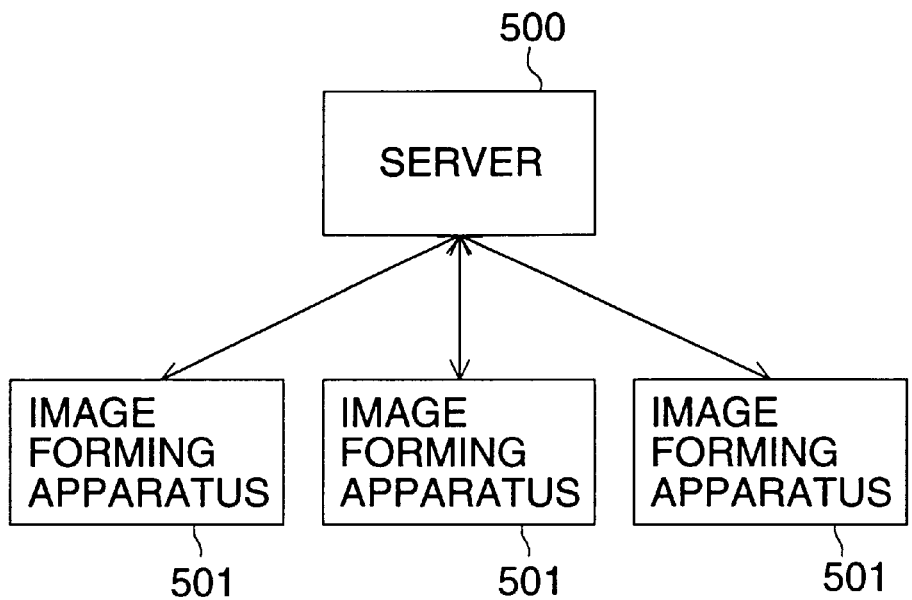
FIG. 5 is a connection diagram of another embodiment showing conceptual connection between a server and an image forming apparatus on a network.

In the network structured as shown in FIGS. 1–4, the invention delivers data corresponding to statistical information to image forming apparatus 501 through server 500 as shown in FIG. 5, based on statistical information obtained from plural image forming apparatuses 501 connected to the server 500. It is possible to deliver data corresponding to statistical information which is obtained from plural image forming apparatuses 501 connected to server 500 and is processed on the image forming apparatus side to image forming apparatus 501 through the server 500, and it is possible to deliver data corresponding to statistical information which is obtained from plural image forming apparatuses 501 connected to server 500 and is processed on the server side to image forming apparatus 501 through the server 500.

Figure 6:
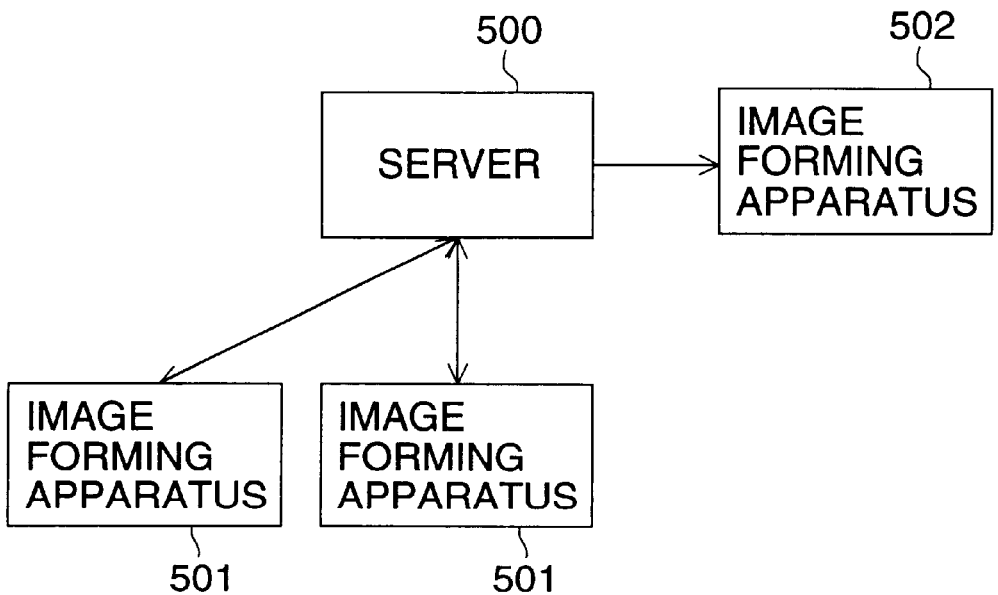
FIG. 6 is a connection diagram of still another embodiment showing conceptual connection between a server and an image forming apparatus on a network.
Figure 7:
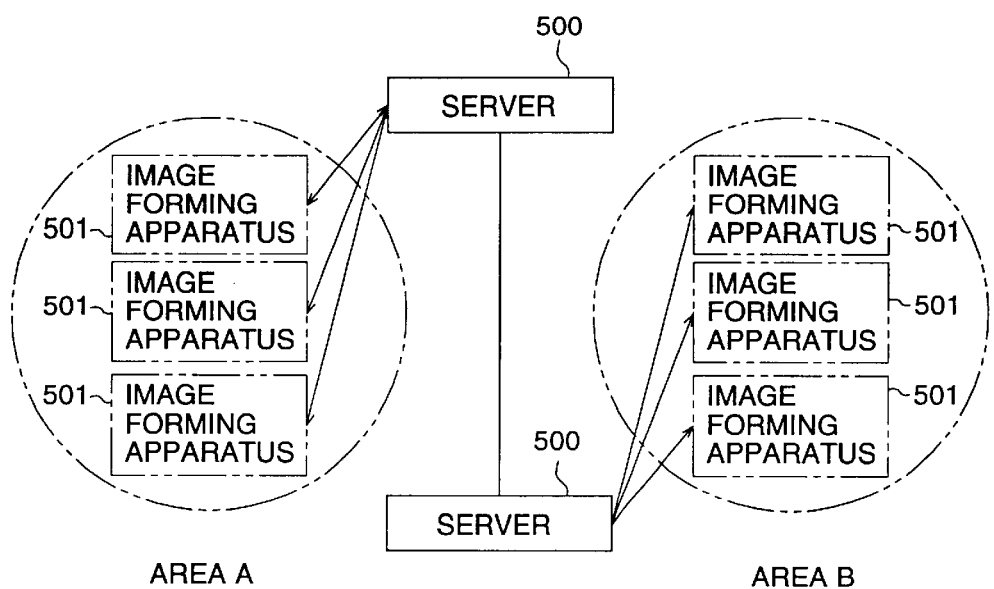
FIG. 7 is a connection diagram of still another embodiment showing conceptual connection between a server and an image forming apparatus on a network.

It is further possible to deliver data to image forming apparatus 502 having no statistical information as shown in FIG. 6. Further, as shown in FIG. 7, plural image forming apparatuses 501 installed in plural areas are connected to server 500, and further, it is possible to deliver by connecting plural servers 500, in which the area is a positional range where a base of service can give its service, such as, for example, another country, prefecture of city.

Figure 8:
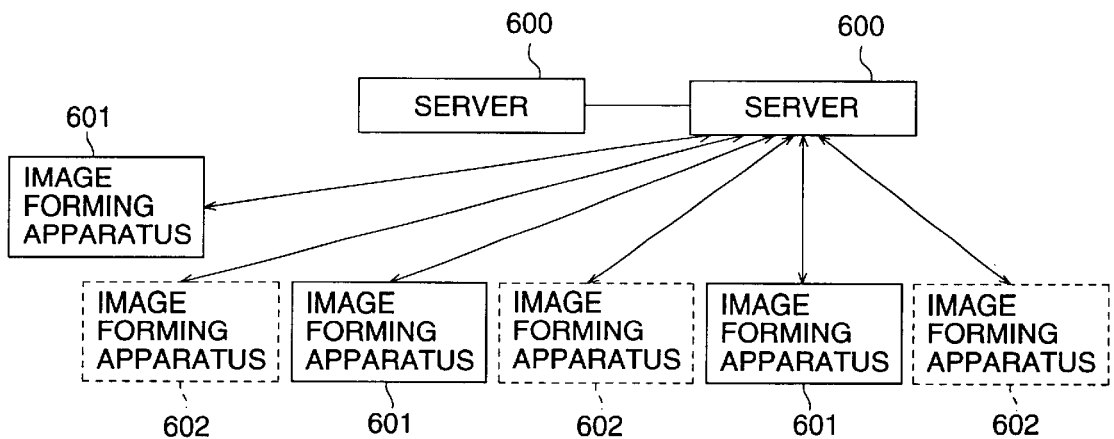
FIG. 8 is a connection diagram of another embodiment showing conceptual connection between a server and an image forming apparatus on a network.
Figure 9:
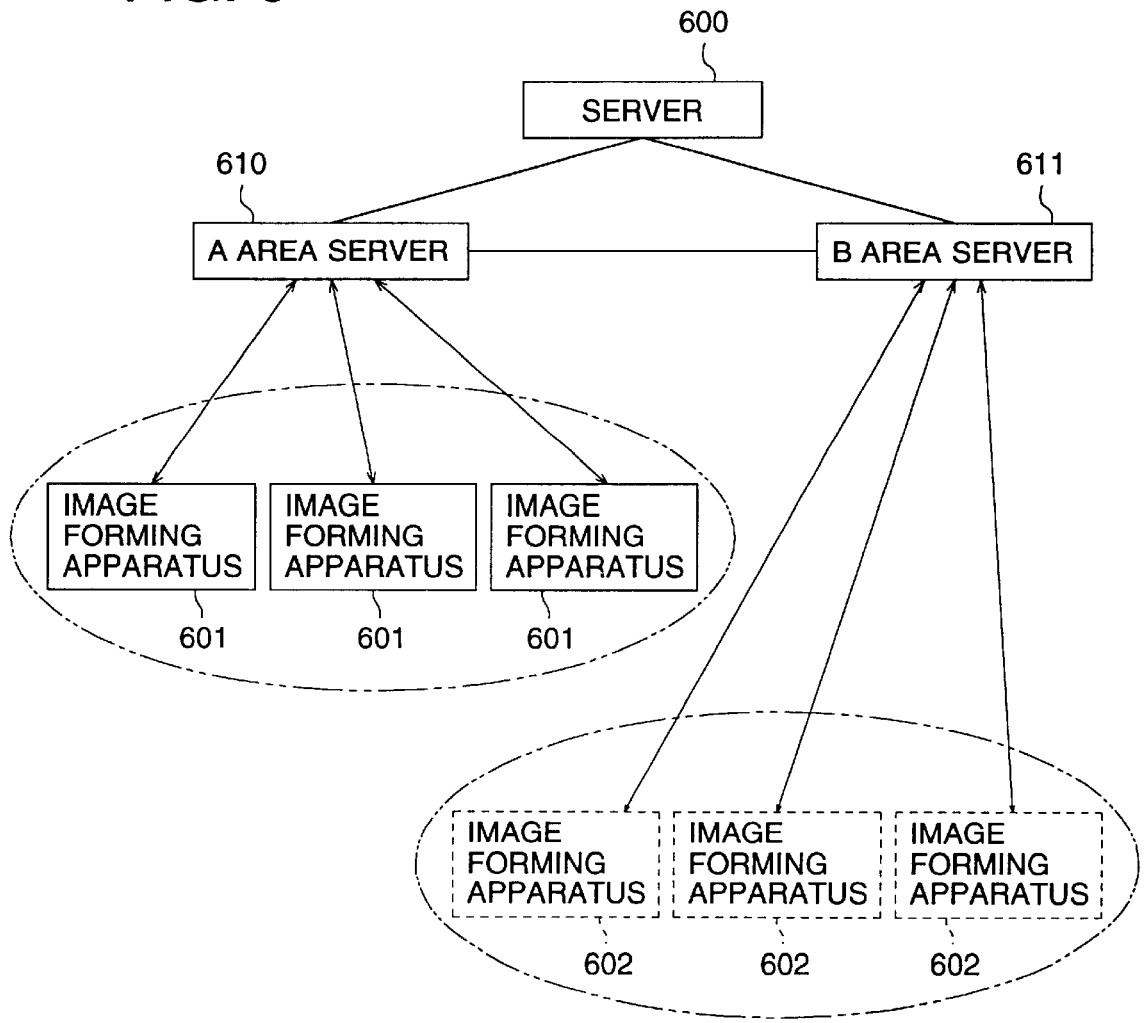
FIG. 9 is a connection diagram of still another embodiment showing conceptual connection between a server and an image forming apparatus on a network.

In the network structured as shown in FIGS. 1–4, server 600 delivers data to specific image forming apparatus 601 as shown in FIG. 8, then, receives information of the state of operation of image forming apparatus 601 in which the data are installed, and delivers data to another image forming apparatus 602 in accordance with the information of the state of operation, in the invention. Further, A area server 610 in the specific area delivers data to image forming apparatus 601 in the specific area as shown in FIG. 9, then, it receives information of the state of operation of image forming apparatus 601 in which the data are installed, and B area server 611 in another specific area can deliver data to image forming apparatus 602 in specific area in accordance with the information of the state of operation.

Figure 10:
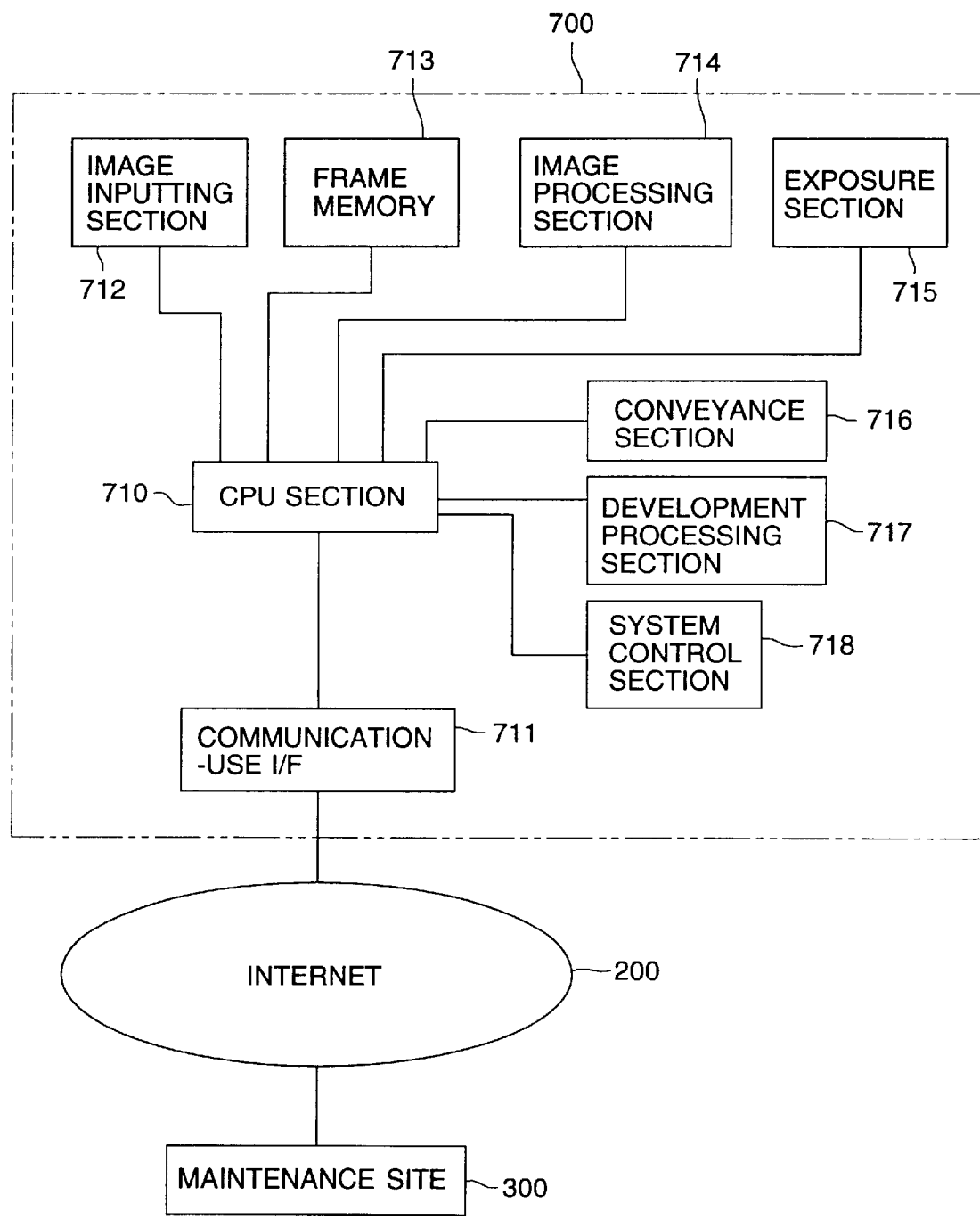
FIG. 10 is a connection diagram of still another embodiment showing conceptual connection between a server and an image forming apparatus on a network.
Figure 11:
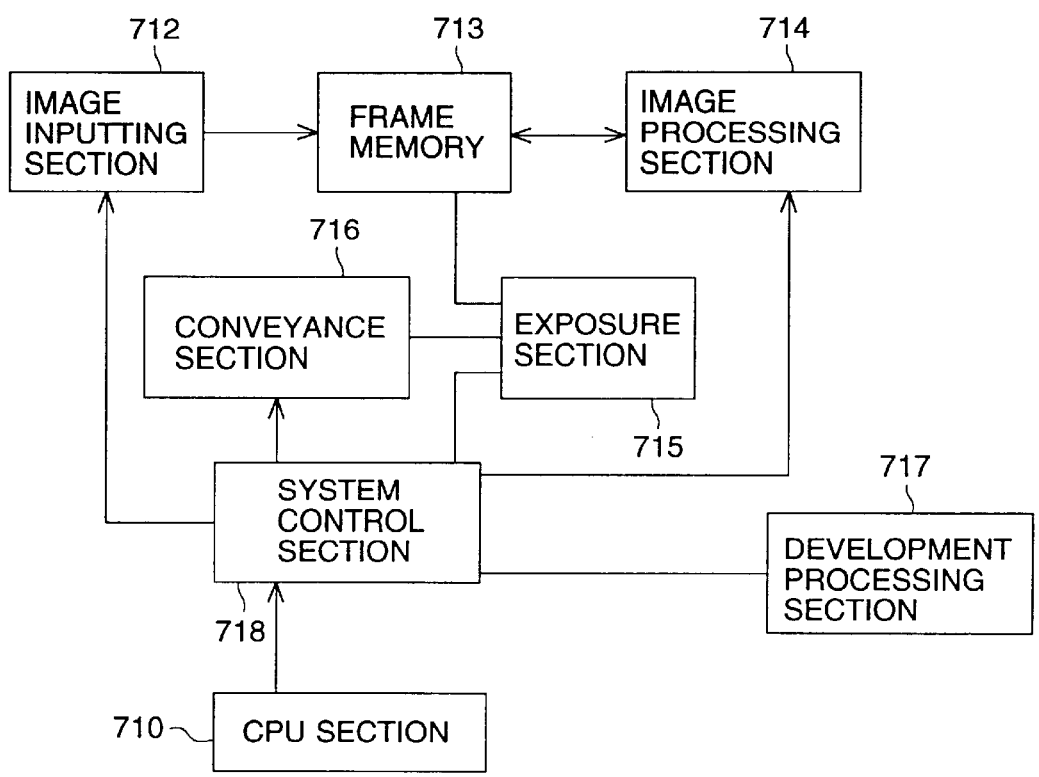
FIG. 11 is a structure diagram showing an embodiment of an image forming apparatus.

In the network structured as shown in FIGS. 1–4, a server delivers, through the server, data corresponding to the server, based on equipment information obtained from an individual image forming apparatus connected to the server. This embodiment will be explained, referring to FIGS. 10 and 11. CPU section 710 of image forming apparatus 700 conducts, through internet 200, data exchange with maintenance site 300 by means of communication I/F 711, and it conducts rewriting of updated data of the CPU section 710 itself.

In addition to the foregoing, it rewrites ROM (flush ROM) capable of rewriting programs for image inputting section 12, frame memory 713, image processing section 714, exposure section 715, conveyance section 716, development processing section 717 and system control section 718. If version updating is conducted normally, CPU section 710 collects updated data of each section and sends them, through communication I/F, to maintenance site 300 through internet 200.

In image forming apparatus 700, an image printing instruction of an operator is transmitted to system control section 718 from CPU section 710. Image inputting is instructed to image inputting section 712 by system control section 718, and digital image data are recorded on frame memory 713. Necessary image processing information is received from system control section 718, and digital image data on frame memory 713 are processed.

Following the instruction from system control section 718, aforesaid image inputting is conducted, and digital image data are recorded on frame memory 713, then, necessary image processing information is received and a recording material conducting image recording in parallel with digital image data processing on frame memory 713 is conveyed. Following the instruction from system control section 718, recording is conducted on an image recording material. Further, development processing section 714 is controlled, and the image recording material on which recording was conducted at exposure section 715 is subjected to development processing.

Further, in the invention, each image forming apparatus connected with a server through the server transmits a request for function updating, and data for the function updating is delivered from the server to the image forming apparatus 700 which requested the function updating.

In the invention, data is automatically delivered to a specific image forming apparatus, then, information of the state of operation of the equipment in which the data is installed is automatically received, and data is automatically delivered to other equipment in accordance with the information of the state of operation. Information of combination of data for each operatable image forming apparatus connected with a server through the server is stored in the server.

Next, an embodiment which is more concrete will be explained. A base which is in charge of maintenance service has a data base which generalizes each equipment data of image forming apparatuses, and it is connected to an internet through a personal connection circuit (for example, OCN economy (Japan Telegraph and Telephone Corporation)). An image forming apparatus is connected to a given connection trader called a provider through connection with an internet through a modem. In this case, it is also possible to prepare a personal computer capable of conducting maintenance in an environment of computer network including an image forming apparatus and thereby to connect through the personal computer, without connecting the image forming apparatus directly to the internet. In this case, even when a virus is mixed, it is possible to guarantee the minimum function, by transmitting necessary data to the image forming apparatus after checking the data received by the personal computer and by preventing invasion of viruses to the image forming apparatus which is a most important portion.

On the image forming apparatus, equipment operation information is transmitted periodically to the prescribed data base server in the form of attached file of electronic mail in accordance with a schedule programmed in advance, such as on a basis of every day, every other day or every other week. On the data base server, the equipment operation information is stored together with operation information in the past. In this case, when transmitting, if the equipment operation information is updated from the previous transmission, it is more efficient to transmit. Further, with regard to information such as error information which causes a file size to grow, if it is subjected to compression processing such as Huffman coding before transmission, it is more efficient to transmit. For the information which is highly confidential, it is subjected to coding by the use of PGP before transmission.

From equipment calibration (conducted with a standard of channel data in FIG. 12) which is made daily, data are transmitted to maintenance cite each time, and in the maintenance cite, statistical data of the data base server are collated with the data in the past, or compared with the standard data. If the data are normal, an instruction of data registration is given to the image forming apparatus, while when the data are abnormal, either an instruction to set up again is given, or a diagnosis for troubles is made to cope with abnormal data.

The standard data (for example, channel data in FIG. 12) used for set up as stated above are sometimes changed daily. For example, it is possible that a different standard value for set up is given to each of plural image forming apparatuses, and a standard of the best condition is distributed to other image forming apparatuses, after the state of operation and complaints about image quality are put together.

Incidentally, when an image forming apparatus detects an error which requires an urgent action in its own operation, it is possible to register temporarily through an electronic mail the locations which need to receive the emergency such as a data base server, a maintenance site and headquarters of chain stores, even if this is out of schedule, and to transmit to a target after selecting it in consideration of circumstances. For example, for the information showing that photographic papers are gone, a target is selected so that this information can be notified to the headquarters of chain stores and to a person who is responsible for equipment, while when an apparatus is diagnosed to be in trouble, an electronic mail is sent so that this information can be notified to a maintenance site.

In the data base server, there is made storage in a form wherein the equipment operation information and a customer information data base are linked so that the maintenance cite and the headquarters of chain stores can check in case of need. Incidentally, in this case, it is also possible not to transmit information of sales data to the data base server on the maker side, by installing separately a data base server operated by a maker of an image forming apparatus and a data base server operated by the headquarters of chain stores. It is also possible to put a data base in terms of sales data in order by time in a day, by a weekday or by a season, as occasion demands, and to display them by using a web server. Further, by analyzing types of templates which were sold and those which were not sold, it is possible to give instructions quickly to eliminate templates which do not sell, and to deliver templates which tend to sell, through a web server. In the case of this delivery, it is more preferable to use electronic watermarks so that the templates may not be copied and used outside.

It is significant to test image processing and confirmation of new software for function extension and debugging for an image forming apparatus by the use of the image forming apparatus which is actually operating for a customer, and in the assumption that the application on the level before launching in the market as stated above is called a beta version, when the beta version is registered in the application server, there are given instructions for installing the application to the image forming apparatus acknowledging that the test will be made, and installation is made through a network. Then, operation information is collected for the divided period such as a week, and if no problem is detected, the version is regarded as a formal version, and the application is installed formally in other image forming apparatuses.

In the maintenance cite, an image inputting section, a frame memory, an image processing section, a conveyance section, an exposure section, a development processing section, a system control section, equipment names in CPU section, serial numbers, repair history, software version operating currently, customer names, customer addresses, telephone numbers and peripheral equipment are made to be in a data base, as an information data base for a customer having an image forming apparatus installed, in addition to the statistical information stated above.

When a new software is registered in a maintenance cite, software of necessary version for each section are combined based on customer information data base of the image forming apparatus registered in the cite and on information of the equipment operation, at the maintenance cite, then, an amount of correction for each type of operation coefficient is combined by obtaining a difference from the stipulated operation by the use of print information, and a version kit corresponding to each image forming apparatus is prepared, so that it is delivered to image forming apparatuses as an attached file of an electronic mail. On the image forming apparatus side where the aforesaid information has been received, the attached file is developed to judge whether software updating is needed or not, and when it is judged to be necessary, software updating is executed. After the software updating is executed, version numbers after the change are put together by CPU section of the image forming apparatus, and are sent to the maintenance cite to be registered again as a new customer information data base.

However, when it is judged at the maintenance cite that forced version-upgrading is necessary as a matter of equipment operation, it is possible to execute version-upgrading without confirming judgment on the image forming apparatus side. Incidentally, in the case of an image forming apparatus which is not ready for connection with an internet, it is connected by the use of a dummy maintenance cite personal computer brought by a person in charge of maintenance and LAN of 100 BASE-TX, then, version-upgrading is conducted, and version-upgrading information is registered in the data base of the maintenance cite, thus, the aforesaid function can be realized.

By making equipment structure of an image forming apparatus which is different in each equipment and the state of operation to be in a data base, by doing in the aforesaid manner, it is possible to collect necessary software version correctly and to prepare the correction of the coefficient of equipment operation based on an amount of processing. Thus, it has become possible to carry out errorless and accurate work with less people and less time, by quantifying the work which has been done manually by a person in charge of maintenance who visited the image forming apparatus.

When a request to add new functions is made by the image forming apparatus, the maintenance cite side sends software for an image inputting section, a frame memory, an image processing section, a conveyance section, an exposure section, a development processing section, a system control section and CPU section which are needed for the requested function, if no problem is found for the request, after referring to software operation conditions such as the maintenance agreement and license agreement.

Incidentally, when an equipment change is caused, version change is processed after confirming the equipment change. Incidentally, when the equipment change does not conform to the maintenance agreement or the license agreement, it is possible to conclude a new contract through on-line sign-up and to conduct version change and function addition.

By making an operatable combination of an image inputting section, a frame memory, an image processing section, a conveyance section, an exposure section, a development processing section, a system control section and CPU section to be in a data base in the server at the maintenance cite as shown in Table 1, it is possible to make a version-upgrading kit simply and accurately.

TABLE 1

| Image inputting section | Frame memory | Image processing section | Conveyance section | Exposure section | Development processing section | System control section | CPU section |
|---|---|---|---|---|---|---|---|
| 1.00 | 1.00 | 1.00 1.10 | 1.00 | 1.00 | 1.00 | 1.00 | 1.00 1.12 1.20 |
| 1.10 | 1.21 | 1.20 1.22 1.22b | 1.10 | 1.10 | 1.10 | 1.10 1.11 | 1.30 1.31 1.32 1.33 |

A new function addition is prepared as an option, and this option functions are shown in Table 2.

TABLE 2

Option function correspondence table

| Function | CPU section version | Exposure section version | Image inputting section version | Image processing section version |
|---|---|---|---|---|
| Standard | 1.00 | 1.00 | 1.00 | 1.00 |
| APS processing | 1.00 | 1.00 | 1.10 | 1.00 |
| Preparation of identity photograph | 1.00-A | 1.00 | 1.00 | 1.00-A |
| Added template | 1.00-B | 1.00 | 1.00 | 1.00-A |

TABLE 2-continued

Option function correspondence table

| Function | CPU section version | Exposure section version | Image inputting section version | Image processing section version |
|---|---|---|---|---|
| Simple character printing function | 1.00-C | 1.00-A | 1.00 | 1.00-B |
| Reversal print | 1.00-D | 1.00 | 1.00-A | 1.00-C |
| Media print | 1.00-E | 1.00-A | 1.00 | 1.00-D |
| Image processing pack | 1.00-F | 1.00 | 1.00-B | 1.00-E |

As shown in the option function correspondence table, when plural functions are provided, an alphabet is added, and when the identity photograph and the reversal print are available, selection is made as follows.
CPU section version: 1.00-AD,
Exposure section version: 1.00,
Image inputting version: 1.00-A
Image processing section version: 1.00-AC By preparing the application updating data by combining the foregoing, it is possible to update functions. Table 3 of version combination is shown. If correspondence is impossible, Z (1.00-Z), for example, is indicated, and no reflection is made on versions.

If all operations are made under 1.00 in the first place, when 1.02 is used for the image processing section, 1.03 needs to be used for the exposure section. When 1.05 is used for the system control section. When there is no description in particular, when 1.05 is used for the image processing section, for example, the image inputting section operates under 1.00 and 1.02.

TABLE 3

Table of version combination

| CPU section | Image inputting section | Frame memory | Image processing section | Conveyance section | Exposure section | Development processing section | System control section |
|---|---|---|---|---|---|---|---|
| 1.00 | 1.00 | 1.00 | 1.00 | 1.00 | 1.00 | 1.00 | 1.00 |
|  | 1.02 |  |  |  | 1.03 |  |  |
|  |  |  | 1 05 |  |  |  | 1.02 |
|  |  | 1.02 | 1.06 |  |  |  |  |

Though the invention has been explained as stated above, referring to the embodiment, the invention is not limited to the embodiment, and disclosed embodiment can be varied in many ways without departing from the spirit and scope of the invention. For example, an image forming apparatus is not limited to one used as a mini-lab, and it may naturally be an image forming apparatus such as another copying machine. Further, the number of image forming apparatuses is not restricted in particular, and the same service can be given regardless of the number.

According to the method of using a server of the present invention connected to a network, by handling information regarding an image forming apparatus by collecting and delivering information regarding a plurality of image forming apparatus, a control for the image forming apparatus and a control for image forming information can be conducted efficiently.

Further, in the method of using a server connected to a network and a server system in the invention, when the state of using a template, the state of using software and sales information, for example, are combined periodically to be analyzed, or when classification is made by a season, an area and the distinction of sex and age of an orderer, there are brought effects that a term of development for new software or data can be shortened, a chance for profit is expanded for an output center or a mini-lab using an output image apparatus, and an orderer for output is favored. Further, for an operator using an output image apparatus, the output image apparatus is stabilized and facility is improved.

What is claimed is:

1. A method of using a server connected with a network, comprising the steps of:

storing data of software to transmit to a plurality of image forming apparatus connected with the network, wherein the software controls the image forming apparatus so as to form an image;

transmitting data of the software to at least one of the plurality of image forming apparatus;

receiving information regarding at least one of a function and a history of the at least one of the plurality of image forming apparatus;

accumulating the received information regarding the function and the history of the at least one of the plurality of image forming apparatus;

upgrading data of the software for improving the function based on the accumulated information regarding the function of the at least one of the plurality of image forming apparatus; and transmitting the upgraded data of the software to the at least one of the plurality of image forming apparatus.

2. The method of claim 1, wherein the information regarding the image forming apparatus is information regarding a result of an image forming processing by the image forming apparatus.

3. The method of claim 1, wherein the server provides at least one of a web service, a FTP service and a mail service.

4. The method of claim 2, wherein the information regarding at least one of a function and a history of the image forming apparatus includes at least one selected from customer information, store information, equipment maintenance information, error history information, failure log information and remote set-up information.

5. The method of claim 2, wherein the information regarding the at least one of a function and a history of the image forming apparatus is the information regarding a result of an image formation processing by the image forming apparatus, and the information regarding a result of an image formation processing by the image forming apparatus includes at least one selected from a number of sheets used for image formation, sizes used for image formation, information regarding templates used for image formation, information regarding image forming apparatus used for image formation, information regarding locations where image formation was conducted, and information regarding an amount of consumables used for image formation.

6. The method of claim 1, wherein the storing step stores statistical information of the received information regarding the image forming apparatus.

7. The method of claim 1, wherein the receiving step receives statistical information regarding the image forming apparatus.

8. The method of claim 1, wherein the software is the control software and the control software includes at least one of a software to control an image recording section of the image forming apparatus, a software to control a conveying section of the image forming apparatus, a software to control a developing section of the image forming apparatus, a software to control an image inputting section of the image forming apparatus, a software to control an application software of the image forming apparatus, a software to control an operating section of the image forming apparatus, a software to control a maintenance section of the image forming apparatus, and a software to control a session section of the image forming apparatus.

9. The method of claim 1, wherein the software is the image processing software and the server stores image data of a template usable in the image processing software and transmits the image data of template to the image forming apparatus.

10. The method of claim 9, wherein the image data of the template are image data serving as a base for forming an output of an image forming apparatus by the image forming apparatus.

11. The method of claim 1, wherein the software is the image processing software, and further comprising the step of:
receiving the information regarding a result of an image formation processing by the image forming apparatus transmitted from each of the plurality of image forming apparatus connected with the server;
wherein the storing step stores an image processing software developed by using the received information regarding a result of an image formation processing by the image forming apparatus.

12. The method of claim 1, wherein the software is the control software, and the control software is a software delivered from at least one of servers installed in plural areas to the server.

13. The method of claim 1, wherein the software is the control software, and the method further comprises the steps of:
receiving the information regarding at least one of a function and a history of the image forming apparatus transmitted from each of the plurality of image forming apparatus connected with a server; and
wherein the storing step stores a software developed by using the received information regarding at least one of a function and a history of the image forming apparatus.

14. The method of claim 1, wherein the receiving step receives data of statistical information as the information at least one of a function and a history of an image forming apparatus.

15. The method of claim 14, wherein the statistical information includes at least one of working information of the image forming apparatus, using information for data acting on the image forming apparatus, image information used by the image forming apparatus, customer information, store information, sales information, equipment maintenance information, error history information, failure log information and remote setup information.

16. The method of claim 14, wherein the server provides at least one of a web service, an FTP (file transfer protocol) service and a mail service.

17. The method of claim 14, wherein the transmitting step transmits the data corresponding to the statistical information on the basis of the statistical information regarding an image forming apparatus transmitted from at least one of a plurality of image forming apparatus connected with the server.

18. The method of claim 14, wherein the transmitting step transmits the data corresponding to the statistical information through the server on the basis of the statistical information regarding an image forming apparatus transmitted from at least one of a plurality of image forming apparatus connected with the server.

19. The method of claim 14, wherein the data are transmitted to an image forming apparatus having no statistical information.

\* \* \* \* \*